US011826974B2

(12) United States Patent
Chauhan et al.

(10) Patent No.: US 11,826,974 B2
(45) Date of Patent: *Nov. 28, 2023

(54) METHODS AND COMPOSITIONS FOR PIGMENTED HYDROGELS AND CONTACT LENSES

(71) Applicant: University of Florida Research Foundation, Inc., Gainesville, FL (US)

(72) Inventors: Anuj Chauhan, Gainesville, FL (US); Phillip J. Dixon, Gainesville, FL (US); Poorvajan Sekar, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/647,859

(22) Filed: Jan. 13, 2022

(65) Prior Publication Data

US 2022/0134694 A1  May 5, 2022

Related U.S. Application Data

(63) Continuation of application No. 16/690,324, filed on Nov. 21, 2019, now Pat. No. 11,260,612.

(60) Provisional application No. 62/770,247, filed on Nov. 21, 2018.

(51) Int. Cl.
*B29D 11/00* (2006.01)
*G02C 7/04* (2006.01)

(52) U.S. Cl.
CPC .. *B29D 11/00903* (2013.01); *B29D 11/00038* (2013.01); *G02C 7/04* (2013.01)

(58) Field of Classification Search
CPC ........ B29D 11/00906; B29D 11/00038; G02C 7/04
See application file for complete search history.

(56) References Cited

U.S. PATENT DOCUMENTS

| 7,762,662 B1 * | 7/2010 | Eno ........................ G02C 7/046 351/159.24 |
| 11,260,612 B2 * | 3/2022 | Chauhan .......... B29D 11/00038 |
| 2004/0219214 A1 * | 11/2004 | Gravett ..................... A61P 9/14 424/484 |
| 2006/0239956 A1 * | 10/2006 | Henson .................... A23G 3/42 424/74 |
| 2010/0330146 A1 * | 12/2010 | Chauhan .............. A61K 9/0051 514/180 |

FOREIGN PATENT DOCUMENTS

WO   WO 2013/142912   * 10/2013   .......... A61K 31/205

OTHER PUBLICATIONS

Minguez-Mosquera, M. Isabel; et al. "Color quality in paprika oleoresins." Journal of Agricultural and Food Chemistry 46.12 (1998): 5124-5127.
Moran, Rami. "Formulae for determination of chlorophyllous pigments extracted with N, N-dimethylformamide." Plant physiology 69.6 (1982): 1376-1381.
Van Nong, Hoang, et al. "Fabrication and vibration characterization of curcumin extracted from turmeric (*Curcuma longa*) rhizomes of the northern Vietnam." Springerplus 5.1 (2016): 1-9.
Noseda, Rodrigo, et al. "A neural mechanism for exacerbation of headache by light." Nature neuroscience 13.2 (2010): 239.
Pasquet, Virginie, et al. "Study on the microalgal pigments extraction process: Performance of microwave assisted extraction." Process Biochemistry 46.1 (2011): 59-67.
Peng, Cheng-Chun; et al. "Extended cyclosporine delivery by silicone-hydrogel contact lenses." Journal of Controlled Release 154.3 (2011): 267-274.
Pitts, Donald G; et al. "Ocular effects of ultraviolet radiation from 295 to 365 nm." Investigative ophthalmology & visual science 16.10 (1977): 932-939.
Priyadarsini, Kavirayani Indira. "The chemistry of curcumin: from extraction to therapeutic agent." Molecules 19.12 (2014): 20091-20112.
Quach, Hao T.; et al. "An improved method for the extraction and thin-layer chromatography of chlorophyll a and b from spinach." Journal of Chemical Education 81.3 (2004): 385.
Quinn, Graham E., et al. "Association of intraocular pressure and myopia in children." Ophthalmology 102.2 (1995): 180-185.
Roberts, Joan E. "Ocular phototoxicity." Journal of Photochemistry and Photobiology B: Biology 64.2-3 (2001): 136-143.
Roberts, C. J.; et al. "Contact lenses in the management of high anisometropic amblyopia." Eye 16.5 (2002): 577-579.
Saxena, Sujata; et al. "Natural dyes: sources, chemistry, application and sustainability issues." Roadmap to sustainable textiles and clothing. Springer, Singapore, 2014. 37-80.
Scheiman, Mitchell, et al. "Prevalence of vision and ocular disease conditions in a clinical pediatric population." Journal of the American Optometric Association 67.4 (1996): 193-202.
Silberstein, Stephen D., et al. "Treatment of menstruation-associated migraine with the nonprescription combination of acetaminophen, aspirin, and caffeine: results from three randomized, placebo-controlled studies." Clinical therapeutics 21.3 (1999): 475-491.
Silberstein, Stephen, et al. "Botulinum toxin type A as a migraine preventive treatment." Headache: The Journal of lead and Face Pain 40.6 (2000): 445-450.

(Continued)

*Primary Examiner* — Amina S Khan
(74) *Attorney, Agent, or Firm* — Thomas | Horstemeyer LLP

(57) ABSTRACT

In general, the disclosure relates to methods and compositions for preparing colorants useful for preparing pigmented hydrogels. The disclosure further relates to pigmented hydrogels comprising the disclosed colorants. In some instances, the colorant is an alcohol extract of an agromaterial, such as turmeric, paprika, spinach, and/or pokorny woad or the colorants comprise one or more of: a carotenoid, chlorophyll-a, chlorophyll-b, a curcumoid, or indigorubin. Alternatively, the colorant can be carbon black. The disclosure further relates to contact lenses comprising the disclosed pigmented hydrogels.

12 Claims, 19 Drawing Sheets

(56) References Cited

OTHER PUBLICATIONS

Siva, Ramamoorthy. "Status of natural dyes and dye-yielding plants in India." Current science (2007): 916-925.
Sliney, David H. "Photoprotection of the eye UV radiation and sunglasses." Journal of Photochemistry and Photobiology B: Biology 64.2-3 (2001): 166-175.
Smith, Emil L. "Solutions of chlorophyll-protein compounds (phyllochlorins) extracted from spinach." Science 88.2277 (1938): 170-171.
Srinivasan, K. "Role of spices beyond food flavoring: Nutraceuticals with multiple health effects." Food Reviews International 21.2 (2005): 167-188.
Vandenabeele, Peter; et al. "Micro-Raman spectroscopy of natural and synthetic indigo samples." Analyst 128.2 (2003): 187-193.
Pfaffenrath, Volker; et al. "Flunarizine (10 and 20 mg) iv versus placebo in the treatment of acute migraine attacks: a multi-centre double-blind study." Cephalalgia 10.2 (1990): 77-81.
Webber, Ann L.; et al. "Amblyopia: prevalence, natural history, functional effects and treatment." Clinical and experimental optometry 88.6 (2005): 365-375.
Wilkins, Arnold J., et al. "Fluorescent lighting, headaches and eyestrain." Lighting Research & Technology 21.1 (1989): 11-18.
Wright, Kenneth W. "Visual development and amblyopia." Handbook of pediatric strabismus and amblyopia. Springer, New York, NY, 2006. 103-137.
Yamauchi, Naoki; et al. "Regulated chlorophyll degradation in spinach leaves during storage." Journal of the American Society for Horticultural Science 116.1 (1991): 58-62.
Zuclich, J. A.; et al. "Ocular damage induced by near-ultraviolet laser radiation." Investigative ophthalmology & visual science 15.9 (1976): 760-764.
Govindarajan, V. S.; et al. "Turmeric-chemistry, technology, and quality." Critical Reviews in Food Science & Nutrition 12.3 (1980): 199-301.
Sekar, Poorvajan, et al., "Pigmented Contact Lenses for managing Ocular Disorders," pp. 1-33.
Abdeldaiem, M. H. "Use of yellow pigment extracted from turmeric (Curcuma longa) rhizomes powder as natural food preservative." American Journal of Food Science and Technology 2.1 (2014): 36-47.
Almutairi, Nawaf, et al. "Assessment of Enchroma Filter for Correcting Color Vision Deficiency." Pacific University (Oregon) (2017).
Ambrogi, A; et al. "Fractional extraction of paprika using supercritical carbon dioxide and on-line determination of carotenoids." Journal of Food Science 67.9 (2002): 3236-3241.
Aobchey, Paitoon, et al. "Simple purification of indirubin from Indigofera tinctoria Linn. and inhibitory effect on MCF-7 human breast cancer cells." Chiang Mai J. Sci 34 (2007): 329-337.
Aronoff, S. "The absorption spectra of chlorophyll and related compounds." Chemical reviews 47.2 (1950): 175-195.
Badawy, Abdel-Rahman, et al. "Contact lenses for color blindness." Advanced healthcare materials 7.12 (2018): 1800152.
Bhosale, Prakash, et al. "Resonance Raman quantification of nutritionally important carotenoids in fruits, vegetables, and their juices in comparison to high-pressure liquid chromatography analysis." Journal of Agricultural and Food Chemistry 52.11 (2004): 3281-3285.
Biacs, Peter A; et al. "Factors affecting stability of colored substances in paprika powders." Journal of Agricultural and Food Chemistry 40.3 (1992): 363-367.
Biacs, Peter A., et al. "Studies on the carotenoid pigments of paprika (Capsicum annuum L. var Sz-20)." Journal of agricultural and food chemistry 37.2 (1989): 350-353.
Birch, Eileen E., et al. "Binocular iPad treatment for amblyopia in preschool children." Journal of American Association for Pediatric Ophthalmology and Strabismus 19.1 (2015): 6-11.
Blackburn, Marcus K., et al. "FL-41 tint improves blink frequency, light sensitivity, and functional limitations in patients with benign essential blepharospasm." Ophthalmology 116.5 (2009): 997-1001.
Brode, Wallace R; et al. "The relation between the absorption spectra and the chemical constitution of dyes. XXVII. cis-trans isomerism and hydrogen bonding in Indigo Dyes1." Journal of the American Chemical Society 76.4 (1954): 1034-1036.
Carr, Gillian. "Woad, tattooing and identity in later Iron Age and early Roman Britain." Oxford Journal of Archaeology 24.3 (2005): 273-292.
Chanayath, Nittaya; et al. "Pigment extraction techniques from the leaves of Indigofera tinctoria Linn. and Baphicacanthus cusia Brem. and chemical structure analysis of their major components." CMU Journal 1.2 (2002): 149-160.
Chattopadhyay, Ishita, et al. "Turmeric and curcumin: Biological actions and medicinal applications." Current science (2004): 44-53.
Collins, Randall S., et al. "Occlusion properties of prosthetic contact lenses for the treatment of amblyopia." Journal of American Association for Pediatric Ophthalmology and Strabismus 12.6 (2008): 565-568.
Kiss, Gergely A. Csiktusnadi, et al. "Optimisation of the microwave-assisted extraction of pigments from paprika (Capsicum annuum L.) powders." Journal of chromatography A 889.1-2 (2000): 41-49.
Daood, H. G., et al. "Extraction of pungent spice paprika by supercritical carbon dioxide and subcritical propane." The Journal of Supercritical Fluids 23.2 (2002): 143-152.
Digre, Kathleen B; et al. "Shedding light on photophobia." Journal of neuro-ophthalmology: the official journal of the North American Neuro-Ophthalmology Society 32.1 (2012): 68.
Dutton J; et al. "Visual Rehabilitation of Aphakic Children" Survey of Ophthalmology vol. 34. No. 5. (1990).
Eretis, Elias, et al. "On the plausible association between environmental conditions and human eye damage." Environmental Science and Pollution Research 9.3 (2002): 163-165.
Fisher, Carolyn; et al. "Separation of paprika pigments by HPLC." Journal of Agricultural and Food Chemistry 35.1 (1987): 55-57.
Gause, Samuel; et al. "Incorporation of ultraviolet (UV) absorbing nanoparticles in contact lenses for Class 1 UV blocking." Journal of Materials Chemistry B 4.2 (2016): 327-339.
Gauthier-Jaques, A., et al. "Improved method to track chlorophyll degradation." Journal of agricultural and food chemistry 49.3 (2001): 1117-1122.
Gnayfeed, M. H., et al. "Supercritical CO2 and subcritical propane extraction of pungent paprika and quantification of carotenoids, tocopherols, and capsaicinoids." Journal of Agricultural and Food Chemistry 49.6 (2001): 2761-2766.
Hornero-Méndez, Dámaso; et al. "Rapid spectrophotometric determination of red and yellow isochromic carotenoid fractions in paprika and red pepper oleoresins." Journal of Agricultural and Food Chemistry 49.8 (2001): 3584-3588.
Inoue, Koichi; et al. "Evaluation of the turmeric (Curcuma longa L.) based on the flow-injection analysis with ultraviolet and fluorometric detections." Analytical letters 34.10 (2001): 1711-1718.
Iriyama, Keiji; et al. "A simple method for extraction and partial purification of chlorophyll from plant material, using dioxane." The Journal of Biochemistry 76.4 (1974): 901-904.
Iriyama, Keiji; et al. "An improved method for extraction, partial purification, separation and isolation of chlorophyll from spinach leaves." Journal of Liquid Chromatography 2.2 (1979): 255-276.
Ittah, Yitzhak; et al. "Hydrolysis study of carotenoid pigments of paprika (Capsicum annuum L. variety Lehava) by HPLC/photodiode array detection." Journal of Agricultural and Food Chemistry 41.6 (1993): 899-901.
Jaren-Galan, Manuel; et al. "Paprika (Capsicum annuum) oleoresin extraction with supercritical carbon dioxide." Journal of agricultural and food chemistry 47.9 (1999): 3558-3564.
Jayaprakasha, Guddadarangavvanahally K; et al. "Improved HPLC method for the determination of curcumin, demethoxycurcumin, and bisdemethoxycurcumin." Journal of agricultural and food chemistry 50.13 (2002): 3668-3672.
Jung, Hyun Jung, et al. "Glaucoma therapy by extended release of timolol from nanoparticle loaded silicone-hydrogel contact lenses." Journal of controlled release 165.1 (2013): 82-89.
Kaiser-Kupfer, Muriel I., et al. "Long-term ocular manifestations in nephropathic cystinosis." Archives of ophthalmology 104.5 (1986): 706-711.

(56) References Cited

OTHER PUBLICATIONS

Kim, Jinah; et al. "Extended delivery of ophthalmic drugs by silicone hydrogel contact lenses." Biomaterials 29.14 (2008): 2259-2269.

Kim, Jinah; et al. "Extended release of dexamethasone from silicone-hydrogel contact lenses containing vitamin E." Journal of Controlled Release 148.1 (2010): 110-116.

Kushner, Burton J. "Atropine vs patching for the treatment of moderate amblyopia in children." Archives of Ophthalmology 120.3 (2002): 387-388.

Kuttan, Ramadasan; et al. "Turmeric and curcumin as topical agents in cancer therapy." Tumori Journal 73.1 (1987): 29-31.

Lai, Edward; et al. "Ultraviolet-blocking intraocular lenses: fact or fiction." Current opinion in ophthalmology 25.1 (2014): 35-39.

Laitonjam, Warjeet S; et al. "Comparative study of the major components of the indigo dye obtained from Strobilanthes flaccidifolius Nees. and Indigofera tinctoria Linn." International Journal of Plant Physiology and Biochemistry 3.5 (2011): 108-116.

Levy, Arieh, et al. "Carotenoid pigments and. beta.-carotene in paprika fruits (*Capsicum* spp.) with different genotypes." Journal of Agricultural and Food Chemistry 43.2 (1995): 362-366.

Lira, Madalena, et al. "Changes in UV-visible transmittance of silicone-hydrogel contact lenses induced by wear." Optometry and Vision Science 86.4 (2009): 332-339.

Loudon, S. E; et al. "The history of the treatment of amblyopia." Strabismus 13.2 (2005): 93-106.

Main, Alan; et al. "Photophobia and phonophobia in migraineurs between attacks." Headache: The Journal of Head and Face Pain 37.8 (1997): 492-495.

Mainster, Martin A. "Violet and blue light blocking intraocular lenses: photoprotection versus photoreception." British journal of ophthalmology 90.6 (2006): 784-792.

Manzan, Anna Carolina CM, et al. "Extraction of essential oil and pigments from Curcuma longa [L.] by steam distillation and extraction with volatile solvents." Journal of Agricultural and Food Chemistry 51.23 (2003): 6802-6807.

Maraña, Olga Monago; et al. "Characterization of Spanish paprika by multivariate analysis of absorption and fluorescence spectra." Analytical Letters 49.8 (2016): 1184-1197.

Maugard, Thierry, et al. "Identification of an indigo precursor from leaves of *Isatis tinctoria* (Woad)." Phytochemistry 58.6 (2001): 897-904.

Minguez-Mosquera, M. Isabel; et al. "Separation and quantification of the carotenoid pigments in red peppers (*Capsicum annuum* L.), paprika, and oleoresin by reversed-phase HPLC." Journal of Agricultural and Food Chemistry 41.10 (1993): 1616-1620.

Minguez-Mosquera, M. Isabel; et al. "Comparative study of the effect of paprika processing on the carotenoids in peppers (*Capsicum annuum*) of the Bola and Agridulce varieties." Journal of Agricultural and Food Chemistry 42.7 (1994): 1555-1560.

\* cited by examiner

FIG. 2A

| Food Colorant | Pigment Tint | Pigmented silicone lenses | | | | | | | |
|---|---|---|---|---|---|---|---|---|---|
| Turmeric | Yellow | | | | | | | | |
| Pigment concentration (µg/g) | | 35.91 | 43.20 | 68.35 | 102.32 | 124.38 | 323.29 | 627.89 | 1330 | 1930 |
| Paprika | Orange | | | | | | | | |
| Pigment concentration (µg/g) | | 16.62 | 46.72 | 57.46 | 71.20 | 133.11 | 149.63 | 117.29 | 162.23 | 203.67 |
| Wood powder | Pink | | | | | | | | |
| Pigment concentration (µg/g) | | - | - | - | 18.21 | 19.17 | 26.63 | 61.84 | | 209.72 |
| Spinach powder | Green | | | | | | | | |
| Pigment concentration (µg/g) | | - | - | 35.54 | 92.73 | 150.39 | 336.35 | 721.41 | 1030 | |
| Turmeric /Spinach | Greenish Yellow | | | | | | | | |
| Pigment concentration (µg/g) | | - | 61.88 | 177 | 246 | 398.6 | 427.89 | 782.9 | | |

FIG. 2C

METHODS AND COMPOSITIONS FOR PIGMENTED HYDROGELS AND CONTACT LENSES

CROSS-REFERENCE TO RELATED APPLICATIONS

This disclosure is a continuation application of U.S. Non-Provisional Application entitled METHODS AND COMPOSITIONS FOR PIGMENTED HYDROGELS," having Ser. No. 16/690,324 filed on Nov. 21, 2019, now U.S. Pat. No. 11,260,612, which claims the benefit of and priority to U.S. Provisional Application Ser. No. 62/770,247, filed on Nov. 21, 2018 the disclosure of which is incorporated herein by reference in its entirety.

BACKGROUND

Excessive exposure to sunlight or artificial lighting can cause many ocular ailments and aggravates age-related ocular diseases. Such exposure can trigger various complication such as inflammatory response, growth originating from the bulbar conjunctiva, and Uveal melanoma. Current protective eyewear devices in the market including UV blocking and photo-chromatic spectacles can be effective, but provide for a low level of comfort and inconsistent use as well as poor or no protection and other wavelengths (high intensity visible light (400-500 nm)). Thus, there is a need for developing contact lenses that provide the desired protection.

SUMMARY

Embodiments of the present disclosure relate to methods and compositions for preparing colorants useful for preparing pigmented hydrogels and contact lens, where the pigmented hydrogels can include one or more colorants.

In an embodiment, the present disclosure provides for a method of preparing a contact lens comprising a colorant, the method comprising: exposing the contact lens one or more colorants, wherein the colorants are incorporated with the contact lens, wherein the contact lens comprises a hydrogel or a silicone-hydrogel, wherein the colorants comprise (or consists of or consists essentially of) one or more of: turmeric, paprika, spinach, woad, or carbon black, or wherein the colorants comprise one or more of: a carotenoid, chlorophyll-a, chlorophyll-b, a curcumoid, indigrubin, indigotin, or indirubin; and separating the contact lens and the colorant (e.g., residual colorant that is not absorbed). The present disclosure also provides for a hydrogel or a silicone-hydrogel prepared according the method described above and others herein. The present disclosure also provides for a contact lens comprising a hydrogel or a silicone-hydrogel prepared according the method described above and others herein.

In an embodiment, the present disclosure provides for a method of making contact lens comprising: in situ polymerization of a monomer mixture with one or more colorants to form a hydrogel or a silicone-hydrogel; and forming the pigmented hydrogel contact lens from the hydrogel or the silicone-hydrogel, wherein the hydrogel or the silicone-hydrogel entraps the colorant.

In an embodiment, the present disclosure provides for a hydrogel or a silicone-hydrogel comprising (or consists of or consists essentially of) a one or more colorants, wherein the colorants comprises (or consists of or consists essentially of) one or more of: turmeric, paprika, spinach, woad, or carbon black, or wherein the colorants comprise one or more of: a carotenoid, chlorophyll-a, chlorophyll-b, a curcumoid, indigrubin, indigotin, or indirubin.

In an embodiment, the present disclosure provides for a contact lens comprising one or more colorants, wherein the colorants comprises (or consists of or consists essentially of) one or more of: turmeric, paprika, spinach, woad, or carbon black, or wherein the colorants comprise (or consists of or consists essentially of) one or more of: a carotenoid, chlorophyll-a, chlorophyll-b, a curcumoid, indigrubin, indigotin, or indirubin. The contact lens can be made of a hydrogel or a silicone-hydrogel, wherein the hydrogel or a silicone-hydrogel entraps the colorants within the hydrogel or a silicone-hydrogel or the colorants are absorbed onto a surface layer of the contact lens. The contact lens can further include a hydrophilic ophthalmic drug, vitamin E, or a combination thereof.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1A shows a potential application of pigmented contact lenses as alternative occlusion patches for treating amblyopia and correcting refractive errors. FIG. 1B shows a disclosed Class 1 UV blocking turmeric loaded yellow contact lenses capable of screening >95% UVA, UVB, and UVC radiations. FIG. 1C shows disclosed pigmented silicone hydrogels with varying color intensity imparted by tuning concentration of the extracted pigment offer a viable treatment option for managing migraines and photophobia. FIG. 1D shows disclosed silicone hydrogels tinted with pigments extracted from woad and paprika offer selective filtering of visible light, aiding CVD patients with enhanced color perception.

FIGS. 2A-2C show disclosed pigmented hydrogels. FIG. 2A shows a p-hydroxyethyl methacrylate gels tinted with the extracted pigments by direct entrapment of the pigment in swollen hydrogels. Gels were soaked in solutions containing natural pigments extracted by incorporation of 0.5 wt. %-33 wt. % of food colorant loading in ethanol. FIG. 2B shows a representative figure demonstrating the synthesis of a tinted lens. FIG. 2C shows photographic images of tinted silicone hydrogels formulated using the same approach.

FIG. 5A shows representative transmittance spectra of 200 μm thick turmeric loaded yellow-pigmented p-HEMA hydrogel lens with 17.09 μg-1 mg of turmeric loading/g of dry lens. These gels were synthesized through dip soaking of pre-polymerized p-HEMA lenses in turmeric/ethanol solutions. FIG. 5B shows representative transmittance spectra of 200 μm thick turmeric loaded yellow-pigmented p-HEMA hydrogel lens with 6.54-18.95 μg of turmeric loading/g of dry lens. A loss of >50% transmittance is observed for loadings >20 µg of turmeric loading/g of dry lens. FIG. 5BC shows a photographic image of batches of pigmented HEMA monomer solutions and the corresponding hydrogels synthesized by in-situ free radical polymerization. The lenses were pigmented by direct entrapment of food colorant particles during polymerization. FIG. 5D shows a representative digital photograph of turmeric loaded silicone hydrogel lenses stored in PBS medium for 7 days. A quick ethanol dip was done prior PBS storage to remove surface deposits from the lenses. No significant pigment diffusion was observed. FIG. 5E shows representative absorbance spectra indicating presence of leached turmeric from a 200 µm thick turmeric powder loaded silicone hydrogel lens stored in PBS medium for 7 days. FIG. 5F shows representative data for the effect of sterilization on loss of pigment from the lens matrix. No significant changes in transmittance were observed.

FIGS. 6A-6D show representative transmittance spectra of 200 µm thick silicone hydrogel lenses loaded with 35.91 µg-1.93 mg of turmeric loading/g of dry lens (yellow), 39.54 µg-1.03 mg of spinach powder loading/g of dry lens (green), 16.62 µg-268.07 µg of paprika loading/g of dry lens (orange), and 18.21 µg-209.72 µg of woad loading/g of dry lens (pink). These gels were synthesized through dip soaking of pre-polymerized silicone lenses in food colorant/ethanol solutions. FIG. 6E shows representative transmittance spectra of 200 µm thick spinach powder loaded green-pigmented silicone hydrogel lens after exposure to sunlight for 7 days. 11.18 µg-125.15 µg of spinach powder/g of dry lens was the resultant pigment mass in the degraded lenses. An 82.5% degradation of active pigment extracted from spinach powder induces loss of hue in the lenses, which potentially limits its application to lenses for migraine therapy.

FIG. 7A shows a representative photographic image of a control Albino rabbit cadaver eye. FIGS. 7B-7C show representative photographic images of silicone scleral lens synthesized by induction of curvature through lens blister packs. The 22 mm scleral lenses were pigmented by soaking control gels in 17.42 wt. % turmeric/ethanol and 8.71 wt. % turmeric/spinach/ethanol solutions. Photograph of control and tinted version of the scleral lens placed on Albino rabbit cadaver eyes to show lens transparency and compatibility. FIG. 7D shows a representative photographic image of an Air Optix™ NIGHT & DAY™ AQUA lens that has been pigmented contact using the disclosed methods and compositions. FIG. 7E shows a representative photographic image of an ACUVUE® TruEye® lens that has been pigmented contact using the disclosed methods and compositions.

FIGS. 8A-8B show a specific cross-section of a turmeric loaded silicone lenses imaged at 40000X-120000X indicating low or no presence of bound particles in the matrix. While imaging a different cross-sectional region (FIGS. 8C-8D) at 120000X magnification factor, a distinct grain boundary between the non-spherical turmeric pigment particle and the hydrogel phase is revealed. Image analysis reveals the average ferret diameter of these pigment particles to be 50 nm which shows promise for drug delivery applications. FIGS. 8E-8F correspond to lenses tinted with spinach and paprika powders indicating non-specific binding of the phase separated pigment particles in the lens matrix.

Figure 1A:
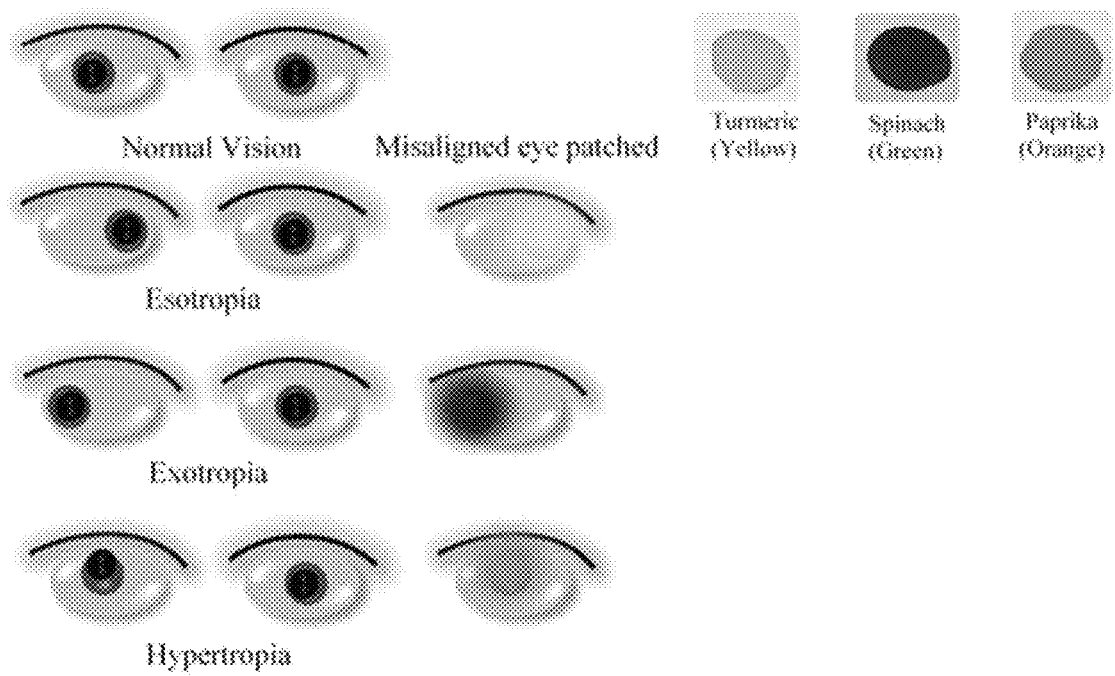
FIGS. 1A-1D show various potential applications of the disclosed methods and compositions.
Figure 1B:
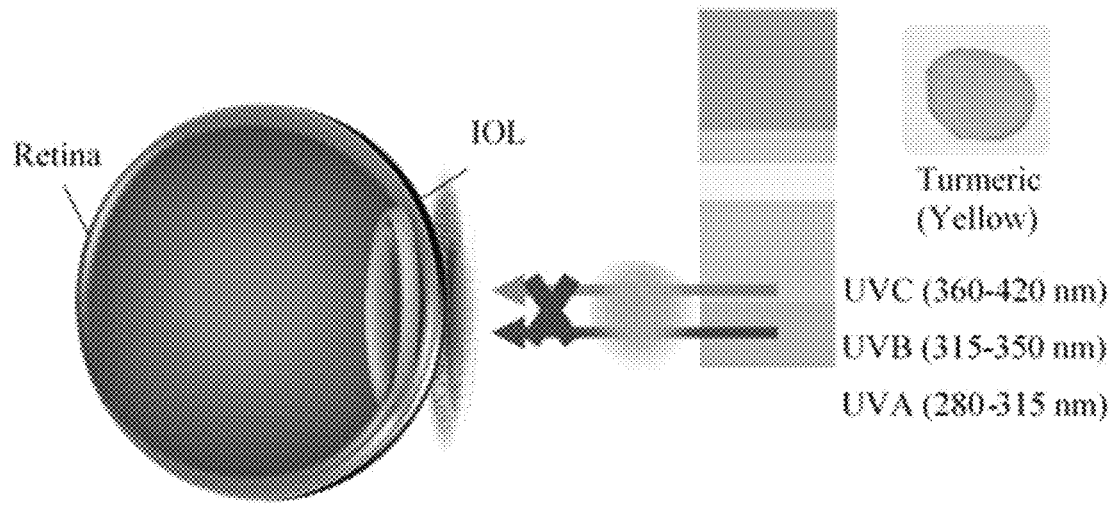
Figure 1C:
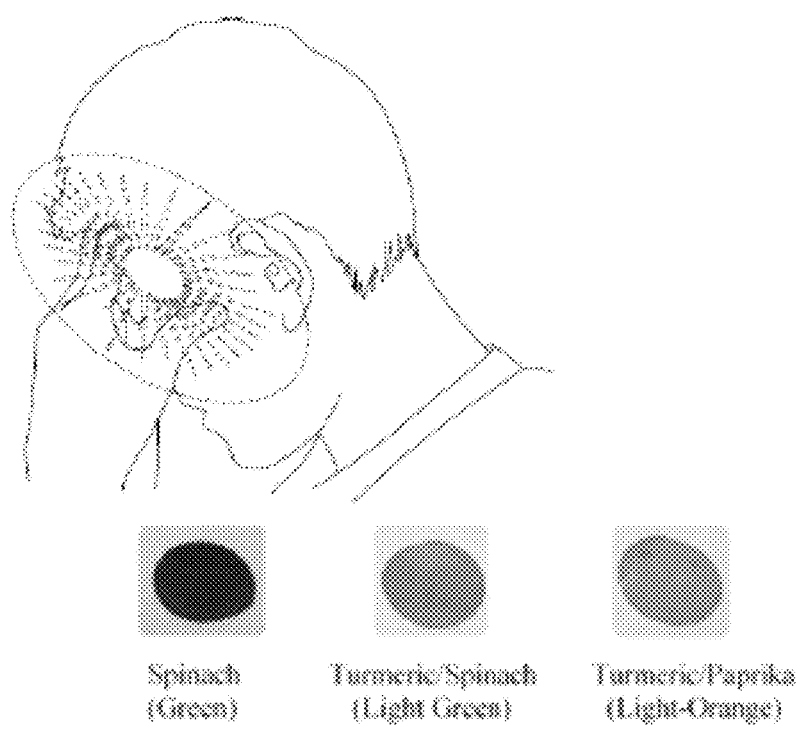
Figure 1D:
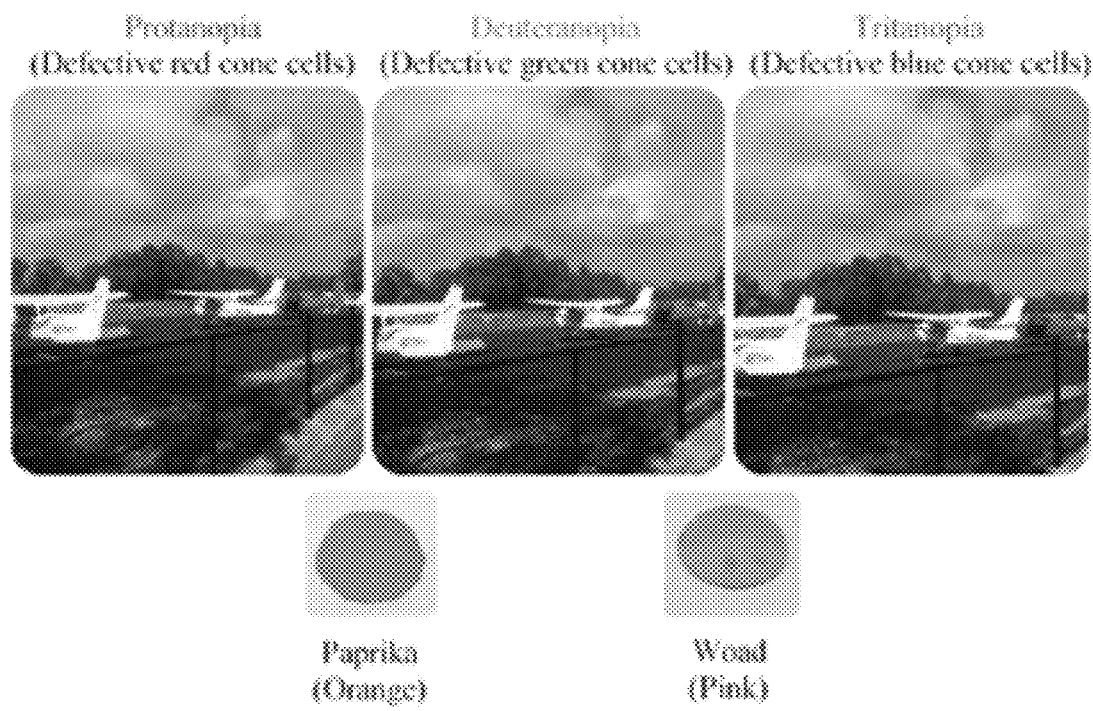

Additional advantages of the present disclosure will be set forth in part in the description which follows, and in part will be obvious from the description, or can be learned by practice of the invention. The advantages of the present disclosure will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

DEFINITIONS

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of". In regard to use of "consisting essentially of" in regard to colorants, components that do not effect or substantially effect the color to be imparted to the hydrogel or the silicone-hydrogel and/or contact lenses or can be present in an amount that is considered an impurity for the preparation of hydrogels or the silicone-hydrogel or contact lenses.

As used in the specification and the appended claims, the singular forms "a," "an" and "the" include plural referents unless the context clearly dictates otherwise. Thus, for example, reference to "a colorant," or "a lens," including, but not limited to, two or more such pigments, colorants, or lenses, and the like.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g. about 1%, about 2%, about 3%, and about 4%) and the sub-ranges (e.g. about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the term "effective amount" refers to an amount that is sufficient to achieve the desired modification of a physical property of the composition or material. For example, an "effective amount" of a colorant refers to an amount that is sufficient to achieve the desired improvement in the property modulated by the formulation component, e.g. achieving the desired level of blocking of a desired wavelength. The specific level in terms of wt % in a composition required as an effective amount will depend upon a variety of factors including the amount and type of colorant, type of hydrogel or the silicone-hydrogel, level of target blocking of a desired wavelength, and end use of the hydrogel or the silicone-hydrogel made using the composition.

As used herein, the terms "optional" or "optionally" means that the subsequently described event or circumstance can or cannot occur, and that the description includes instances where said event or circumstance occurs and instances where it does not.

Unless otherwise specified, temperatures referred to herein are based on atmospheric pressure (i.e. one atmosphere).

DISCUSSION

Embodiments of the present disclosure relate to methods and compositions for preparing colorants useful for preparing pigmented hydrogels or the silicone-hydrogels and pigmented contact lenses, where the pigmented hydrogels or the silicone-hydrogels and pigmented contact lenses can include one or more colorants. In some instances, the colorant (e.g., also referred to as pigment) is an extract of an agro-material, such as turmeric, paprika, spinach, and/or woad (as well as components of each agro-material that produce the corresponding color), while the colorant can also be carbon black, independently or in combination with the agro-material colorants.

In general, the method of preparing a pigmented contact lens including a colorant can include exposing a contact lens (e.g., made of a swellable hydrogel or the silicone-hydrogel) to one or more colorants to form the pigmented contact lens. Exposing can include contacting the contact lens and the colorant(s) for a period of time for the colorant to be incorporated with the contact lens. In an aspect, the colorant can be incorporated with the contact lens by being disposed on the surface of the contact lens, forming a layer (e.g., colorant layer or polymer layer including the colorant) on the contact lens, absorbed into the surface layer of the contact lens, and the like. In an aspect, absorption can be accomplished by swelling the contact lens material so the molecules of the colorant can be absorbed (e.g., infiltrate into) into the surface layer of the contact lens. The absorption of the colorant into the surface layer can include infiltrating of the colorant molecules a short distance into the contact lens material (e.g., into gaps or voids within the hydrogel or the silicone-hydrogel), where the distance depends upon the material of the contact lens, the organic liquid, the colorant, and conditions (e.g., time and temperature). For example, the distance can be about 1 to 35% of the thickness of the contact lens, about 1 to 25% of the thickness of the contact lens, about 1 to 20% of the thickness of the contact lens, about 1 to 15% of the thickness of the contact lens, about 1 to 10% of the thickness of the contact lens, or about 1 to 5% of the thickness of the contact lens.

In an aspect, the mixing can be done under conditions (e.g., time and temperature) so that the colorant incorporated with the contact lens reaching an equilibrium (e.g., with the contact lens and the colorant). In an example, mixing can include equilibrating the contact lens (e.g., made of a hydrogel or silicone-hydrogel) in an organic liquid (e.g., ethanol, methanol, isopropyl alcohol, dichloromethane, chloroform, ethyl acetate, diethyl ether, and combinations thereof) colorant solution, for example. The organic liquid solution can cause the hydrogel or the silicone-hydrogel to swell so the colorants can infiltrate into the hydrogel or the silicone-hydrogel. For example, the contact lens can be made of 2-hydroxyethyl methacrylate (HEMA) or silicone based material as well as other polymer contact lens material that is described herein and otherwise available. The mixing or equilibrating can include soaking the contact lens in the solution for about 2 to 16 hours, about 10 to 14 hours, or about 12 hours at about room temperature (about 25° C.). When reference is made to "hydrogel" this also can include reference to "silicone-hydrogel" as well based on the context upon which it is used. As a result, the term hydrogel may be used as opposed to hydrogel or silicon-hydrogel.

After the desired amount of colorant is incorporated with the contact lens, the contact lens and the remaining colorant is solution can be separated. The contact lens can be washed and stored for later use.

Alternatively, the contact lens can be formed by the in situ polymerization of a monomer mixture with the colorant solution including one or more colorants (e.g., in an organic liquid (e.g., ethanol, methanol, isopropyl alcohol, dichloromethane, chloroform, ethyl acetate, diethyl ether, and combinations thereof)) to form a contact lens having a pigmented hydrogel that entraps the colorant. The monomer mixture can include hydrophilic monomers such as hydroxyethyl methacrylate (HEMA), dimethyl acrylate (DMA), methacrylic acid, or silicone monomer such as 3-[tris (trimethylsiloxy)silyl]propyl methacrylate (Tris methacrylate), or polydimethyl siloxane (PDMS), or preferably mixtures of silicone and hydrophilic monomers, as well as those those described herein. Additionally, additives such as polyvinyl alcohol, polyvinyl pyrrolidone, hyaluronic acid, crosslinker EGDMA—ethylene glycol dimethacrylate, PDMS—poly dimethyl siloxane can be added to the formulation. Hydrogels or silicone-hydrogels formed from these monomer are also included within the types of hydrogel or silicone-hydrogels that the contact lens can be made of. When reference is made to "hydrogel" this also can include reference to "silicone-hydrogel" as well based on the context upon which it is used.

In an alternative approach, mixing or the in situ polymerization can be accomplished by incorporating these colorant by incorporating colorants into nanoparticles (e.g., micro-emulsions, liposomes, polymeric nanoparticles, and the like about 10 to 500 nm or about 10 to 200 nm in diameter) and using them in the methods described above and herein.

In an aspect, the colorant can be included in an organic liquid solution (e.g., ethanol solution). For example, the ethanol solution can include one or more colorants (e.g., turmeric, paprika, spinach, woad, and/or carbon black). In an aspect, the colorant can be an organic liquid (e.g., ethanol, methanol, isopropyl alcohol, dichloromethane, chloroform, ethyl acetate, diethyl ether) extract of turmeric, paprika, spinach, woad, or combinations thereof. The organic liquid (e.g., ethanol, methanol, isopropyl alcohol, dichloromethane, chloroform, ethyl acetate, diethyl ether) extract of turmeric can include about 0.006 wt. %-5 wt. % of colorant or about 0.006 wt. %-3.25 wt. % of colorant. The organic liquid (e.g., ethanol, methanol, isopropyl alcohol, dichloromethane, chloroform, ethyl acetate, diethyl ether) extract of paprika can include about 0.001 wt. %-6 wt. % of colorant or about 0.054 wt. %-4.81 wt. % of colorant. The organic liquid (e.g., ethanol, methanol, isopropyl alcohol, dichloromethane, chloroform, ethyl acetate, diethyl ether) extract of spinach can include about 0.001 wt. %-6 wt. % of colorant or about 0.064 wt. %-4.45 wt. % of colorant. The organic liquid (e.g., ethanol, methanol, isopropyl alcohol, dichloromethane, chloroform, ethyl acetate, diethyl ether) extract of paprika can include about 0.001 wt. %-0.5 wt. % of colorant or about 0.002 wt. %-0.022 wt. % of colorant.

In an alternative approach the components in turmeric, paprika, spinach, and/or woad that provide the color or act as the colorant can be used instead or in combination with the turmeric, paprika, spinach, and/or woad. The chemical components can include carotenoids (e.g., carotene, xanthophylls, xanthophyll esters), chlorophyll-a and/or -b, curcumoids (e.g., curcumin, dimethoxy curcumin, bisdemethoxy curcumin), indigrubin, indigotin, and/or indirubin. The amounts of each of these components would correspond to the amount of these chemicals that are provided by the amounts of turmeric, paprika, spinach, and/or woad as described above. The amounts of each of these components in the hydrogel or contact lens would correspond to the amount of these chemicals that are provided by the amounts of turmeric, paprika, spinach, and/or woad as described herein for the hydrogel or contact lens. The components can be used in an organic liquid solution, in in situ polymerization, in nanoparticles, and the like to form the contact lens.

In regard to carbon black, the carbon black can be incorporated directly adding it at about 0.01 to 1 wt. % or about 0.3 wt. % in the monomer formulation. Alternatively, carbon black can be put in solution (e.g., a solvent such as water, ethanol, methanol, isopropyl alcohol, dichloromethane, chloroform, ethyl acetate, diethyl ether) where the solution can include about 0.01 to 5 wt. % of the carbon black or about 0.01 to 1 wt. % of carbon black.

After the contact lens and the colorant are mixed (e.g., equilibrated) the contact lens (also referred to as the "pigmented contact lens") and the colorant can be separated. For example, the organic liquid used in loading the colorant can be extracted by drying or soaking the lens in a suitable buffer. After extraction, the contact lens can be rapidly rinsed with the organic liquid (e.g., ethanol) to remove the surface deposits. In addition or alternatively, the pigmented contact lens can be rinsed with in an isotonic aqueous solution (e.g., phosphate-buffered saline (PBS)). In addition, the lens can be packaged in a buffer or artificial tears.

In general, the method provided herein can be used to produce a pigmented hydrogel, which can be used to form a contact lens. In other embodiments, the pigmented hydrogel can be used in other articles other than the contact lens. Discussion herein regarding the contact lens can be applied to other articles as is appropriate. The pigmented hydrogel (e.g., the contact lens or other article) can include one or more colorants, where the colorant comprises one or more of: turmeric, paprika, spinach, woad, or carbon black and/or carotenoids (e.g., carotene, xanthophylls, xanthophyll esters), chlorophyll-a and/or -b, curcumoids (e.g., curcumin, dimethoxy curcumin, bisdemethoxy curcumin), indigrubin, indigotin, and/or indirubin.

In an aspect, the amount of colorant (e.g., turmeric, paprika, spinach, woad, and carbon black) present in the contact lens or hydrogel can vary depending upon the desired results. In general, the amount of turmeric in the contact lens or hydrogel can be about 2 mg/g contact lens or hydrogel to 700 micrograms/g contact lens or hydrogel or about 30 micrograms/g contact lens or hydrogel to 700 micrograms/g contact lens or hydrogel. In general, the amount of spinach in the contact lens or hydrogel can be about 30 mg/g hydrogel to 600 micrograms/g contact lens or hydrogel or about 90 micrograms/g contact lens or hydrogel to 600 micrograms/g contact lens or hydrogel. In general, the amount of paprika in the contact lens or hydrogel can be about 15 micrograms/g contact lens or hydrogel to 300 micrograms/g contact lens or hydrogel or about 50 micrograms/g contact lens or hydrogel to 300 micrograms/g contact lens or hydrogel. In general, the amount of woad in the contact lens or hydrogel can be about 15 micrograms/g contact lens or hydrogel to 80 micrograms/g contact lens or hydrogel or about 20 micrograms/g contact lens or hydrogel to 80 micrograms/g contact lens or hydrogel. The amount of carotenoids (e.g., carotene, xanthophylls, xanthophyll esters), chlorophyll-a and/or -b, curcumoids (e.g., curcumin, dimethoxy curcumin, bisdemethoxy curcumin), indigrubin, indigotin, and/or indirubin present based on these amounts could also be used by directly including one or more of these compounds as opposed to or in combination with the agromaterial itself.

The colorants disclosed herein can be surface active, i.e., many compounds including ophthalmic drugs can bind to the surface of the particles and or molecules, resulting in an increase in drug loading and/or release duration. The hydrophobic ophthalmic drugs such as cyclosporine, dexamethasone, latanoprost, bimatoprost can be co-loaded with the colorants by adding the drugs to the solution of colorants in organic liquids. Vitamin E that is used as a diffusion barrier can also be added to the mixture to result in loading of the colorants for selective light blocking, vitamin E for controlled release of the drug, and the drug for treatment of ophthalmic diseases. The typical vitamin E loading desired ranges from 5% to 40% (w/w) in the dried contact lens. Hydrophilic drugs such as timolol, dorzolamide, brimonidine, cysteamine can be loaded sequentially, i.e., soaking the lens already loaded with colorant or colorant and vitamin E into the drug solution for a 1 hr to 7 days depending on the time needed for equilibration. The mass of drugs vary depending on the disease and the duration of release, but on average amounts range from 100 to 500 microgram. The presence of the colorant could also help in reducing the degradation rate of drugs that are prone to degradation.

COMPOSITIONS AND METHODS

The American conference of governmental industrial hygienists (ACGIH) recommends a threshold UV-A (spectral range of 315 nm-400 nm) ocular exposure limit of less than 1 MW/cm$^2$ for periods greater than 1000 seconds (Refs. 1-3). Excessive exposure to sunlight or artificial lighting can cause many ocular ailments and aggravates age-related ocular diseases. UV exposure can trigger serious complications such as inflammatory response to the corneal endometrium (photo keratitis), growth originating from the bulbar conjunctiva (Pingueculae and ptergygia), and Uveal melanoma, a malignant tumor originating from the iris (Refs. 3-5). In adults, IOL blocks UV light, but its ability to completely phase out the high energy visible (HEV) radiations is likely limited (Ref. 6). The development of IOL occurs until a young age of 20, and so UV exposure can potentially hinder the vision of young children (Refs. 7-9). Modern day kids with access to electronic devices including laptops and tablets are particularly vulnerable to induced visual stresses upon prolonged viewing and exposure to harmful high energy visible (HEV) radiation emitted from these devices. Though, the current protective eyewear devices in the market including UV blocking and photochromatic spectacles have proven effective, low comfort and inconsistent wear time permit possibility of minor UV exposure (Refs. 4, 10, and 11). Additionally, violet (400-440 nm) and blue (440-500 nm) which comprise the shorter wavelength and thus high energy part of the visible spectrum could also cause retinal damage particularly because these components of the spectrum are not blocked by the cornea or the intra ocular lens (Ref. 12). Thus, there is a need for developing contact lenses that block UV as well as high intensity visible light (400-500 nm).

Another potential application of the tinted contacts includes treating photophobia and refractive errors in amblyopic children. Photophobia is an eye disorder associated with the patient's abnormal sensitivity of light preventing visual acuity during daylight (Refs. 13-18). It also impairs visual functioning in an illuminated indoor setting. Amblyopia is a medical condition which involves poor visual acuity due to immature visual centers in the brain responsible for visual processing (Refs. 9 and 19-24). With a prevalence of approximately 2% of the US population, it is one of the common causes of decreased visual acuity in newborns, infants and toddlers. The processing of physical objects by visual centers in the brain through high-resolution images captured by the retina is critical for visual development in infants. An orthodox treatment for amblyopia in children involves occluding or patching the unaffected eye to improve acuity of the affected eye (Refs. 20-23). Since an amblyopic eye is misaligned with its neighbor, it is accompanied by refractive errors and generates dissimilar retinal images, which impairs visual development in children. A pigmented contact lens with a darker hue can also be used as alternative occlusion patches to treat amblyopic population, thereby reducing wear discomfort due to patching for a prolonged duration. Another more recent treatment for amblyopia is based on putting on a red colored lens on one eye and a green colored lens on the other, forcing both eyes to be functional as the child views red and green images. Thus, placing a red tinted contact on one eye and a green tinted lens on the other could be an effective for treating amblyopia. Innovative binocular iPad treatment and contact lens treatment have also been proposed for management of anisometropic amblyopia (Refs. 24-25).

Another indication that can potentially benefit from tinted contacts is color vision deficiency. About 8-10% of the current color-blind population, especially 8% of the males and 0.5% of females have dichromatic vision (Refs. 26-27).The dichromatic population are classified as red-green color deficient and blue-yellow color deficient. The two common subgroups of red-green color deficiency include deuteranopia and protanopia. Corrective glasses coated with multiple layers to block a selective bandwidth from the visible spectrum (~540-570 nm, an overlap between the red and green color regimes) is recommended to enhance color perception among CVD population. Though, optical assistive devices like Enchroma glasses are promising for effective CVD management, their high cost and issues with wear discomfort are still issues to be addressed (Ref. 28). Tritanopia or blue-yellow color blindness is a rarer form of color-blindness occurring in ~1% of the male and 0.03% of the female population (Ref. 26). Contact lenses which can selectively filter portions of cyan and green light (~450-510 nm) can help CVD patients to discriminate between blue and yellow hues of the objects that are visually processed. To achieve blocking of selected wavelength range of light, the lens matrix could potentially be tinted to transform it to a multi notch filter.

The extractable pigments that govern the color of natural food powders perceived could aid in this transfiguration (Refs. 29-68). Beyond flavoring and dyeing, the agro-food powders including tumeric, paprika, spinach and woad powders are commonly considered as nutraceuticals (Refs. 36-38). Studies in the past decade have shown pigments extracted from these powders to possess multiple health benefits (Refs. 29, 30, 33, 35, 38, 39, 51, and 63). These include anticancer, antibacterial properties, improved brain function (BDNF booster), effective rheumatoid arthritis and blood pressure management (Refs. 29, 39, and 51). A wide array of these medicinal benefits has encouraged development of efficient and novel extraction methods in the past decade. These methods commonly involve steam distillation of plant products or food powders, extraction by dissolution in organic solvents and supercritical carbon di-oxide (Refs. 30, 34, 40, 41, 43-47, 50-55, 57-63, and 65). Further, improved HPLC and NMR characterization have enabled accurate pigment detection and structural identification (Refs. 31, 32, 42-44, 46, 48, 49, 52-56, and 66-68). These hue imparting pigments include (see Refs. 29, 32, 35, 44, 60, and 63): curcumoids (turmeric), carotenoids (paprika), chlorophyll (spinach), and indigotan/indirubin (woad powder). The potential benefits associated with these pigments for ocular therapeutics have still not been extensively explored.

The present disclosure pertains to methods and compositions for fabrication of a tinted contact lens that blocks UV, as well as selected portions of the visible light to address the indications discussed above. The approach is based on loading colored pigments extracted from natural agro-products. Without wishing to be bound by a particular theory, it is believed that the agro-origin of the powders can lead to improved lens biocompatibility. Moreover, the use of ethanol as a medium for extraction can improve the tendency of an extracted pigment to remain entrapped in the lenses during storage. The entrapped pigments are significantly larger than the pore size in the lenses and should not induce wear scattering of the visible light, thereby retaining clarity. Based on the specific indications targeted, in the examples herein below, various extracted pigments were specifically examined: use of turmeric for blocking high intensity visible light; spinach and paprika for developing green and red tints; and woad for developing lenses for CVD patients. FIGS. 1A-1D illustrate the various indications that could benefit from the methods and compositions for tinted contacts in the present disclosure.

REFERENCES

References are cited herein throughout using the format of reference number(s) enclosed by parentheses corresponding to one or more of the following numbered references. For example, citation of references numbers 1 and 2 immediately herein below would be indicated in the disclosure as (Refs. 1 and 2).

Ref. 1. S. Gause, A. Chauhan, J. Mater. Chem. B, 2016, 4, 327.

Ref. 2. D. G. Pitts, A. P. Cullen, P. D. Hacker, Invest. Ophthalmol. Vis. Sci. 1977, 16, 932.

Ref. 3. J. E. Roberts, J. Photochem. Photobiol. B, 2001, 64, 136.

Ref. 4. D. H. Sliney, J. Photochem. Photobiol. B, 2001, 64, 166.

Ref. 5. J. A. Zuclich, J. S. Connolly, Invest. Ophthalmol. Vis. Sci. 1976, 15, 760.

Ref. 6. E. Lai, B. Levine, J. Ciralsky, Curr. Opin. Ophthalmol. 2014, 25, 35.

Ref. 7. G. E. Quinn, J. A. Berlin, T. L. Young, S. Ziylan, R. A. Stone, Ophthalmology, 1995, 102, 180.

Ref. 8. M. Scheiman, M. Gallaway, R. Coulter, F. Reinstein, E. Ciner, C. Herzberg, M. Parisi, J. Am. Optom. Assoc. 1996, 67, 193.

Ref. 9. K. W. Wright, Visual Development and Amblyopia, in Pediatric Ophthalmology and Strabismus, 157, Springer, New York, USA 2003.

Ref. 10. E. Feretis, P. Theodorakopoulos, C. Varotsos, M. Efstathiou, C. Tzanis, T. Xirou, N. Alexandridou, M. Aggelou, Environmental Science and Pollution Research, 2002, 9 163.

Ref. 11. M. Lira, E. M. Dos Santos Castanheira, Optom. Vis. Sci. 2009, 86, 332.

Ref. 12. M. A. Mainster, Br. J. Ophthalmol. 2006, 90, 784.

Ref. 13. K. B. Digre, K. C. Brennan, J. Neuro-ophthalmol. 2012, 32, 68.

Ref. 14. M. I. Kaiser-Kupfer, R. C. Caruso, D. S. Minkler, W. A. Gaahl, Arch. Ophthalmol. 1986, 104, 706.
Ref. 15. A. Main, A. Dowson, M. Gross, Headache. 1997, 37, 492.
Ref. 16. S. D. Silberstein, J. J. Armellino, H. D. Hoffman, J. P. Battikha, S. W. Hamelsky, W. F. Stewart, R. B. Lipton, Clin. Ther. 1999, 21, 475.
Ref. 17. S. D. Silberstein, N. Mathew, J. Saper, S. Jenkins, Headache. 2000, 40, 445.
Ref. 18. P. Volker, O. Wolfgang, H. Wolfgang, Cephalalgia. 1990, 10, 77.
Ref. 19. A. L. Webber, J. Wood, Clin. Exp. Optom. 2005, 88, 365.
Ref. 20. R. S. Collins, M. E. McChesney, C. A. McCluer, M. P. Schatz, J. AAPOS, 2008, 12, 565.
Ref. 21. J. J. Dutton, Surv. Ophthalmol. 1990, 34, 365.
Ref. 22. S. E. Loudon, H. J. Simonsz, Strabismus. 2005, 13, 93.
Ref. 23. B. J. Kushner, Arch. Ophthalmol. 2002, 120, 387.
Ref. 24. C. J. Roberts, G. G. Adams, Eye (Lond). 2002, 16, 577.
Ref. 25. E. E. Birch, S. L. Li, R. M. Jost, S. E. Morale, A. De La Cruz, D. Stager Jr. L. Dao, D. R. Stager Sr. J. AAPOS. 2015, 19, 6.
Ref. 26. A. R. Badawy, M. U. Hassan, M. Elsherif, Z. Ahmed, A. K. Yetisen, H. Butt, Adv. Healthcare Mater. 2018, 7, 1800152.
Ref. 27. J. D. Mollon, J. Pokorny, and K. Knoblauch, Normal and Defective Colour Vision, Oxford University Press, 2003.
Ref. 28. N. Almutairi, J. Kundart, N. Muthuramalingam, J. Hayes, K. Citek, Assessment of Enchroma Filter for Correcting Color Vision Deficiency, 2017.
Ref. 29. V. S. Govindarajan, W. H. Stahl, CRC Critical Reviews in Food Science and Nutrition, 1980, 12, 199.
Ref. 30. M. H. Abdeldaiem, American Journal of Food Science and Technology, 2014, 2, 36.
Ref. 31. K. Inoue, Y. Yoshimura, H. Nakazawa, Analytical Letters, 2001, 34, 1711.
Ref. 32. G. K. Jayaprakasha, L. Jagan Mohan Rao, K. K. Sakariah, J. Agric. Food Chem. 2002, 50, 3668.
Ref. 33. R. Kuttan, P. C. Sudheeran, C. D. Josph, Tumori. 1987, 73, 29.
Ref. 34. A. C. C. M. Manzan, F. S. Toniolo, E. Bredow, N. P. Povh, J. Agric. Food Chem. 2003, 51, 6802.
Ref. 35. K. Priyadarsini, Molecules, 2014, 19, 20091.
Ref. 36. S. Saxena, A. S. M. Raja, S. S. Muthu, Natural Dyes: Sources, Chemistry, Application and Sustainability Issues, in Roadmap to Sustainable Textiles and Clothing: Eco-friendly Raw Materials, Technologies, and Processing Methods, 37, Springer, Singapore, 2014.
Ref. 37. R. Siva, Current Science, 2007, 92, 916.
Ref. 38. K. Srinivasan, J. Food Reviews Inter. 2005, 21, 167.
Ref. 39. I. Chattopadhyay, K. Biwas, U. Bandyopadhyay, R. K. Banerjee, Current Science, 2004, 87,44.
Ref. 40. G. A. Csiktusnadi Kiss, E. Forgacs, T. Cserhati, T. Mota, H. Morais, A. Ramos, J. Chromatogr. A. 2000, 889, 41.
Ref. 41. A. Ambrogi, D. A. Cardarelli, R. Eggers, J. Food Sci. 2002, 67, 3236.
Ref. 42. P. Bhosale, I. V. Ermakov, M. R. Ermakov, W. Gellermann, P. S. Bernstein, J. Agric. Food Chem. 2004, 52, 3281.
Ref. 43. P. A. Biacs, B. Czinkotai, A. Hoschke, J. Agric. Food Chem. 1992, 40, 363.
Ref. 44. P. A. Biacs, H. G. Daood, A. Pavisa, F. Hajdu, J. Agric. Food Chem. 1989, 37, 350.
Ref. 45. H. G. Daood, V. Illes, M. H. Gnayfeed, B. Meszaros, G. Horvath, J. Supercrit. Fluids. 2002, 23, 143.
Ref. 46. C. Fisher, J. A. Kocis, J. Agric. Food Chem. 1987, 35, 55.
Ref. 47. M. H. Gnayfeed, H. G. Daood, V. Illes, P. A. Biacs J. Agric. Food Chem. 2001, 49, 2761.
Ref. 48. D. Hornero-Méndez, M. I. Minguez-Mosquera, J. Agric. Food Chem. 2001, 49, 3584.
Ref. 49. Y. Ittah, J. Kanner, R. Granit, J. Agric. Food Chem. 1993, 41, 899.
Ref. 50. M. Jarén-Galán, U. Nienaber, S. J. Schwartz, J. Agric. Food Chem. 1999, 47, 3558.
Ref. 51. A. Levy, S. Harel, D. Palevitch, B. Akiri, E. Menagem, J. Kanner, J. Agric. Food Chem. 1995, 43, 362.
Ref. 52. M. I. Minguez-Mosquera, D. Hornero-Mendez, J. Agric. Food Chem. 1993, 41, 1616.
Ref. 53. M. I. Minguez-Mosquera, D. Hornero-Mendez, J. Agric. Food Chem. 1994, 42, 1555.
Ref. 54. M. I. Minguez-Mosquera, A. Perez-Galvez, J. Agric. Food Chem. 1998, 46, 5124.
Ref. 55. V. Pasquet, J. R. Cherouvrier, F. Farhat, V. Thiery, J. M. Piot, J. B. Berard, R. Kaas, B. Serive, T. Patrice, J. P. Cadoret, L. Picot, Process Biochemistry, 2011, 46, 59.
Ref. 56. A. Gauthier-Jaques, K. Bortlik, J. Hau, L. B. Fay, J. Agric. Food Chem. 2001, 49, 1117.
Ref. 57. K. Iriyama, N. Ogura, A. Takamiya, J. Biochem. 1974, 76, 901.
Ref. 58. K. Iriyama, M. Shiraki, M. Yoshiura, J. Liquid Chromatogr. 1979, 2, 255.
Ref. 59. R. Moran, Plant Physiology, 1982, 69, 1376.
Ref. 60. H. T. Quach, R. L. Steeper, G. W. Griffin, J. Chem. Edu. 2004, 81, 385.
Ref. 61. E. L. Smith, Science. 1938, 88, 170.
Ref. 62. N. Yamauchi, A. E. Watada, J. Am. Soc. Hortic. Sci. 1991, 116, 58.
Ref. 63. P. Aobchey, S. Phutrakul, S. Sinchaikul, S. T. Chen, CM. J. Sci. 2007, 34, 329.
Ref. 64. G. Carr, Oxford J. Arch. 2005, 24, 273.
Ref. 65. N. Chanayath, S. Lhieochaiphant, S. Phutrakul, CMU J. 2002, 1, 149.
Ref. 66. W. Laitonjam, W. Sujata, Intr. J. Plant Physiology Biochem. 2011, 3, 108.
Ref. 67. T. Maugard, E. Enaud, P. Choisy, M. D. Legoy, Phytochemistry. 2001, 58, 897.
Ref. 68. P. Vandenabeele, L. Moens, Analyst. 2003, 128, 187.
Ref. 69. M. K. Blackburn, R. D. Lamb, K. B. Digre, A. G. Smith, J. E. A. Warner, R. W. McClane, S. D. Nandedkar, W. J. Lansgeberg, R. Holubkov, B. J. Katz, Ophthalmology. 2009, 116, 997.
Ref. 70. R. Noseda, V. Kainz, M. Jakubowski, J. J. Gooley, C. B. Saper, K. Digre, R. Burstein, Nat Neurosci, 2010, 13, 239.
Ref. 71. A. J. Wilkins, I. Nimmo-Smith, A. I. Slater, L. Bedocs, Lighting Res. Technol. 1989, 21, 11.
Ref. 72. H. J. Jung, M. A. Jaoude, B. E. Carbia, C. Plummer, A. Chauhan, J. Control. Release. 2013, 165, 82.
Ref. 73. J. Kim, A. Conway, A. Chauhan, Biomaterials, 2008, 29, 2259.
Ref. 74. J. Kim, C. C. Peng, A. Chauhan, J. Control. Release, 2010, 148, 110.
Ref. 75. C. C. Peng, A. Chauhan, J. Control. Release, 2011, 154, 267.
Ref. 76. H. V. Nong, L. X. Hung, P. N. Thang, V. D. Chinh, L. V. Vu, P.T. Dung, T. V. Trung, P. T. Nga, SpringerPlus. 2016, 5, 1174.
Ref. 77. S. Aronoff, Chem. Rev. 1950, 47, 175.

Ref. 78. O. M. Marana, T. J. B Garcia, T. G. Diaz, Analytical Letters, 2016, 49, 1184.
Ref. 79. W. R. Brode, E. G. Pearson, G. M. Wyman, J. Am. Chem. Soc. 1954, 76, 1034.
Ref. 80. D. Hornero-Mendez, M. I. Minguez-Mosquera, J. Agric. Food Chem. 2001, 49, 3584.

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g. amounts, temperature, etc.), but some errors and deviations should be accounted for. Unless indicated otherwise, parts are parts by weight, temperature is in ° C. or is at ambient temperature, and pressure is at or near atmospheric.

2. Experimental Section 2.1 Materials

The primary constituents of the hydrogels including 2-hydroxyethyl methacrylate (HEMA, 97%) monomer, ethylene glycol dimethyl acrylate (EGDMA), 1-Vinyl-2-pyrrolidinone (NVP), and Dimethyl acrylamide (DMA) were purchased from Sigma-Aldrich. 3-Methacryloxy-propyl-tris-(Trimethyl-siloxy) silane and TRIS monomer were obtained from Silar (Wilmington, NC, USA). Ocular medications including timolol maleate (≥98%) and dexamethasone (≥98%) were purchased from Sigma-Aldrich Chemicals (St. Louis, MO, USA). The macromer Acryloxy Terminated Ethylene-oxide Dimethyl-siloxane-Ethylene oxide Aba Block Copolymer (Product Code: DBE-U12) was purchased from Gelest Inc. The UV photo initiator Darocur® TPO was supplied by Ciba Specialty Chemicals (Tarrytown, NY, USA). Vitamin E (DL-alpha tocopherol, >96%) was purchased from Sigma-Aldrich. The food colorants and vegetable powder samples used for the study including turmeric (UPC: 011433071123), spinach powder (UPC: 850627005410 885710046216), paprika (UPC: 852664345023) and woad powder were received from Deep foods (Union, NJ), Hoosier Hill Farm (Fort Wayne, IN), Trader Joe's (Gainesville, FL), and Pure Suds (Clark Summits, PA). Phosphate buffered saline (PBS), without calcium and magnesium was purchased from Media-tech, Inc. (Manassas, VA, USA). The Albino rabbit cadaver eyes used for the demonstration of tinted lens wear were purchased from Pel-freez biologics (CA, USA). Ethanol (200 proof) was purchased from Decon Laboratories Inc. (King of Prussia, PA, USA). All chemicals were used as received without further purification.

2.2 Synthesis of Silicone and p-HEMA Hydrogels

The p-HEMA hydrogels were synthesized by free radical solution polymerization of the monomer through UV photo-initiation (Refs. 72-75). The monomer mixture was prepared by addition of HEMA (2.7 mL), the cross linker EGDMA (10 µL), and deionized (DI) water (2 mL) in a scintillating vial. The batch of stirred solution (4.7 mL) was then purged with compressed nitrogen for 20 minutes to reduce dissolved oxygen, a potential free-radical scavenger. The photo-initiator, Darocur® TPO (6 mg) was added to the monomer mixture and subjected to stirring at 300 rpm for 10 minutes to ensure complete dissolution of the initiator. The solution was then introduced into a mold comprising of two glass plates separated by a 200 µm polyester spacer. The mold was then placed on an Ultraviolet transilluminator UVB-10 (Ultra-Lum, Inc.) and cured by irradiating UVB light (305 nm) for 40 minutes. After polymerization, each gel was removed from the glass mold and was cut into circular gels of 18 mm diameter was rinsed and stored in PBS for further use. UV curing a single batch of monomer mixture yielded around 12-15 lenses. The same protocol was employed to synthesize silicone hydrogels from a monomer mixture batch comprising DMA (0.8 mL), TRIS (0.8 mL), DBE-U12 (0.8 mL), EGDMA (0.1 mL), NVP (0.12 mL), and the photo-initiator, Darocur® TPO (12 mg).

2.3 Pigment Extraction

The organic food colorants considered in this study are solid particulate powders at room temperature. The dissolution of food powders in organic solvents was adopted as the principle extraction procedure (Refs. 29, 34, 41, 57, and 65). The color is due to the presence of pigments that can be extracted in organic liquids such as ethanol. Powders were soaked in ethanol (6 mL) at loadings ranging from 0.5 wt. % to 33 wt. %, and in some cases up to 50% for an extraction time of 12 hours, after which the pigmented solution was passed through a syringe filter to screen out the leached turmeric particles greater than 0.22 µm in size.

The yield, i.e., mass of pigment extracted per gram of powder was determined by evaporating the solvent and measuring mass of pigment that was extracted from a given amount of powder. Specifically, food powders (2 g) were added to ethanol (6 mL) and mixed briefly for 2-3 minutes to facilitate dissolution of extractable pigments. After an extraction time of 12 hours, the organic solvent was passed through a 0.22 µm nylon syringe filter to remove larger food colorant particles. The colloidal dispersion was kept in a ventilated enclosure to facilitate evaporation of ethanol at a room temperature of 25° C. Heating of the pigmented ethanol solution or retaining extracts in a temperature-controlled oven was not considered to avoid degradation of temperature sensitive pigments in spinach powder and paprika. The mass of the extracted pigment was measured after ethanol evaporation and used to determine the yield.

2.4 Absorption Spectra of Food Colorants

The potential of extracted pigments to selectively block a targeted wavelength range was characterized by measuring the absorbance spectra by UV-Vis spectrophotometry (Genesys™ 10 UV, Thermo Spectronic, Rochester, NY, USA) in the spectral range of 200-500 nm. The absorbance of extracted pigments is determined by its concentration in the aqueous loading solution and molar absorptivity. The measured yield from a 1:3 ratio of powder to ethanol was used to determine the concentration of the extracted pigment in ethanol. Due to high absorbance of the pigments, serial dilutions with ethanol were required to yield a calibration solution with a concentration of 0.053 mg/mL for turmeric, 0.426 mg/mL for spinach powder, 0.54 mg/mL for paprika and 0.26 mg/mL for woad powder respectively. The Beer-Lambert's law describing the relationship between absorbance of the food colorants and its corresponding concentration was used to compute the molar absorptivity of the pigment, $$A(\lambda) = \varepsilon(\lambda) C l_0,$$

where $l_0$ is the path length (1 cm) and C is the concentration of the food colorant in ethanol. Next, the absorbance of the solutions obtained via extraction at lower powder loadings (0.6 wt. %-17.4 wt. %) and molar absorptivity obtained earlier was used to estimate the pigment concentration. Table 1 presents the amount of pigment extracted with increasing food colorant loadings in ethanol. The relationship between food colorant mass and the extracted pigment is linear for all food colorant types expect for pigments extracted from woad powder. The spectra of pigments extracted from turmeric, spinach powder, paprika, and woad powder were in agreement with the spectra published in the literature (Refs. 76-80).

TABLE 1

| Food Colorant Type | loading in 6 ml ethanol (g) | | | | | | | | |
|---|---|---|---|---|---|---|---|---|---|
|  | 0.03 | 0.06 | 0.1 | 0.2 | 0.25 | 0.5 | 1 | 2 | 3 |
|  | Extracted pigment (mg) | | | | | | | | |
| Turmeric | 1.68 | 5.34 | 5.51 | 11.41 | 19.22 | 27.77 | 58.21 | 106.96 | 159.26 |
| Paprika | 2.59 | 5.57 | 10.43 | 23.98 | 33.80 | 62.01 | 120.83 | 239.55 | — |
| Spinach powder | 3.05 | 5.07 | 8.13 | 15.11 | 15.61 | 33.81 | 60.47 | 121.19 | 220.95 |
| Woad powder | 0.11 | 0.18 | 0.29 | 0.42 | 0.44 | 0.60 | 0.76 | 0.87 | 1.05 |

2.5 Incorporation of Pigments into Hydrogel Lenses

A pre-polymerized p-HEMA or silicone hydrogel lens of 18 mm diameter and ~40 μL gel volume was introduced into a scintillation vial containing food colorant/ethanol solution (6 mL). The concentration of the pigment varied from 0.006 wt. % -3.25 wt. % for turmeric, 0.054 wt. %-4.81 wt. % for paprika, 0.064 wt. %-4.45 wt. % for spinach powder and, 0.002 wt. %-0.022 wt. % for woad powder.

Figure 2A:
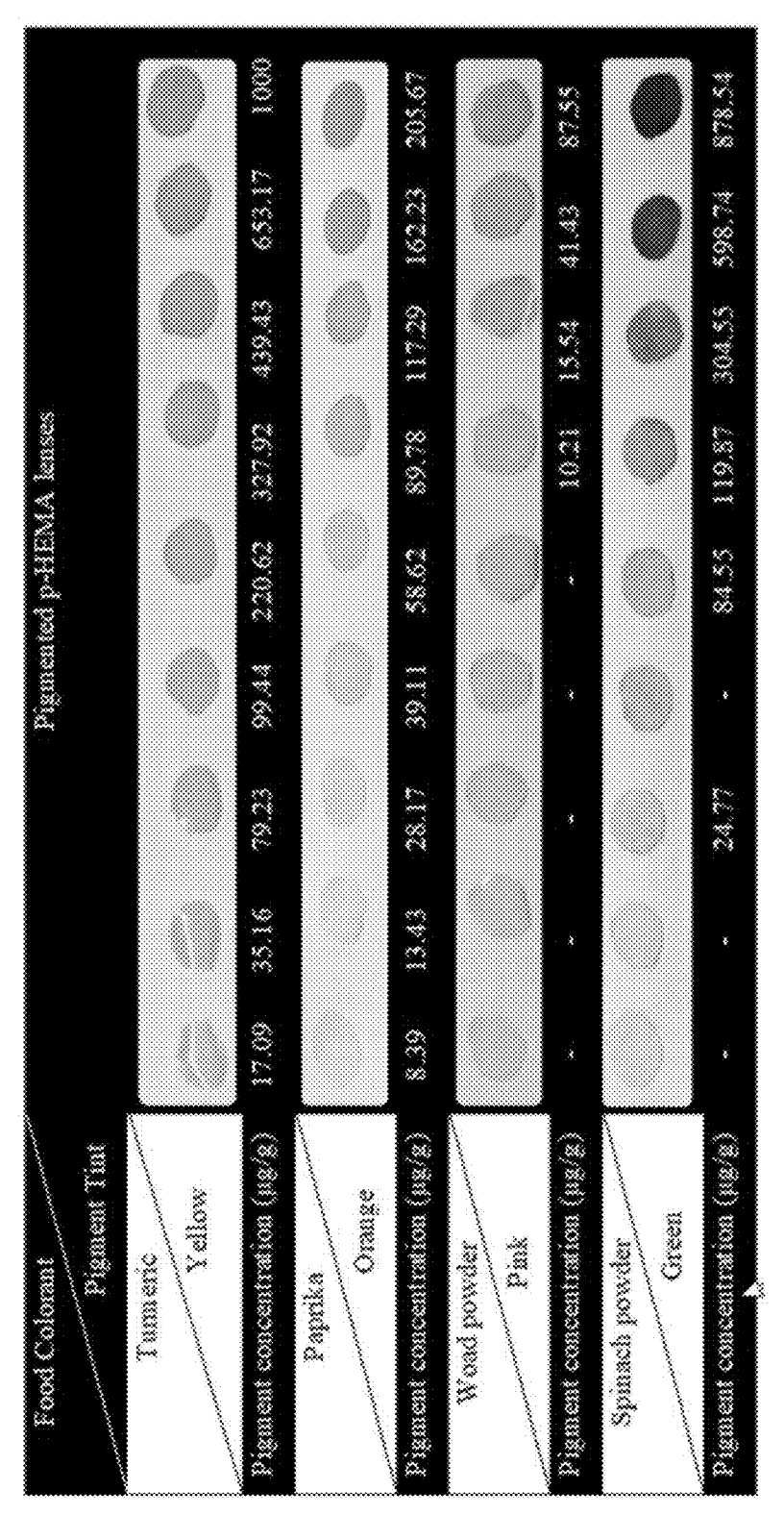
Figure 2B:
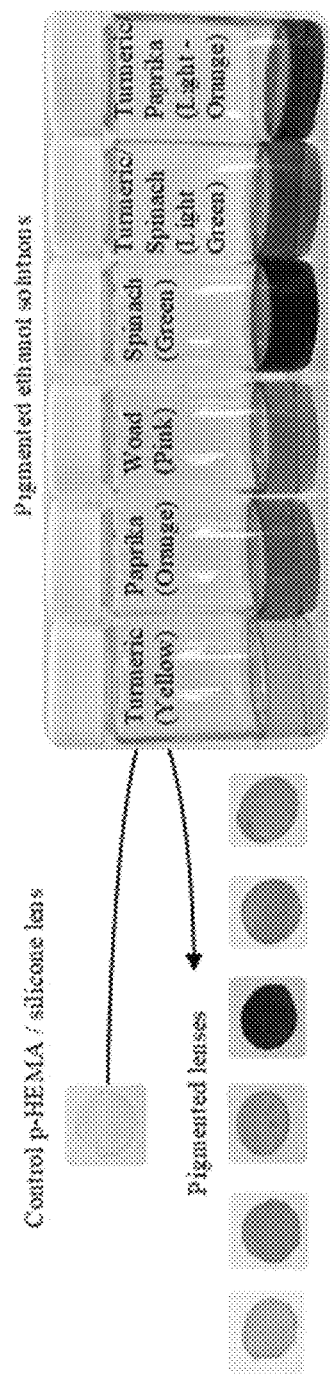

The soaked gel was left for 12 hours to ensure pigment equilibration at room temperature (25° C.). The soaking of p-HEMA and silicone lenses in ethanol causes the pores present in the hydrogel matrix to swell allowing the pigment to diffuse into the lens. The swollen pigmented gel was finally removed from the solution using a tweezer and air-dried to enable shrinking of the porous hydrogel network. The dried hydrogel was later rinsed with a quick ethanol dip to extract pigment deposits adsorbed on the surface of the lenses. The lenses were later rinsed in PBS to shrink the tinted lenses to their pre-deformed shape and stored in PBS medium (3 mL) for further experiments. FIGS. 2A-2C show representative images of solutions containing pigments extracted by incorporation of 0.5 wt. %-33 wt. % of turmeric, paprika, spinach, woad powder, and a 1:1 mixture of turmeric/spinach and turmeric/paprika powders in ethanol and the corresponding images of tinted p-HEMA and silicone hydrogel lenses.

2.6 Direct Pigment Entrapment through In Situ Polymerization

An in situ free radical polymerization approach was also employed to entrap the pigment and induce a stable tint. The HEMA or silicone monomer mixture along with dispersed particles and the ethanol soluble pigment extract was left for 12 hours prior polymerization. The same composition described in section 2.2 was used along with the addition of 0.5-33 wt. % of turmeric, paprika, woad, and spinach powder to the monomer mixture.

2.7 Transmittance Measurements of Tinted p-HEMA and Silicone Hydrogel Lenses

The soft contact lens (p-HEMA/silicone hydrogel) were taken out of the PBS medium and blotted with a Kimwipe to remove residual solution on the surface of the lens. The dried hydrogel was carefully mounted on the outer surface of the quartz cuvette by forceps without inducing structural damage to the hydrogel material. The outer surface of the cuvette chosen for affixing the hydrogel was a region visible through the cell holder's aperture to allow exposure to a monochromatic UV beam for recording the transmittance spectra. The transmittance measurements were taken at a 1 nm interval in the spectral bandwidth of 190 nm-1100 nm on UV-Vis spectrophotometer (GENESYS™ 10 UV, Thermo Spectronic, Rochester, NY, USA). The spectral bandwidth of 190 nm-1100 nm was chosen to gauge the UV-blocking capability of the lenses in the UVR range from 190 nm-400 nm, HEV radiation or blue-light filtering ability in the visible range from 385 nm-500 nm and, its ability to transmit the rest of visible radiation in the range of 500 nm-700 nm. The percentage of UV radiation blocked by the tinted soft contact lenses in the UVR range was quantified for three spectral subdivisions namely, UVC (190 nm-280 nm), UVB (280 nm-315 nm) and, UVA (320 nm-400 nm). The measured transmittance was converted to absorbance:

$$A(\lambda) = -\log_{10} \frac{T(\lambda)}{100},$$

which was then fitted to the Beer Lambert's law to obtain concentration of the pigments in the lens. Data in the range where the pigments absorb strongly was used in the fitting. The concentration of the food colorant in both the phases obtained through absorbance measurements were later fit to a linear model:

$$C_{lens} = k C_{loading}.$$

This theoretical model serves as a design tool for determining what concentration is needed in the loading solution to achieve the desired concentration in the lens. FIG. 5 shows representative plots indicating a linear relationship between the pigment concentration in the hydrogel phase and that in the aqueous loading solution.

2.8 SEM Imaging of Tinted Hydrogel Lenses

To substantiate the presence of pigment-imparting particles phase separated in the hydrogel matrix, scanning electron microscopy (SEM) images of pigmented contact lenses were recorded. Dried hydrogel samples were placed on a carbon tape mounted on a silicon wafer. The images were obtained on FEI Nova NanoSEM 430 in the Nanoscale Research Facility (NRF) at the University of Florida, Gainesville. Tinted p-HEMA and silicone hydrogels were sputter coated with an ultra-thin, 10 nm thick layer of electrically conducting gold-palladium alloy prior high-resolution SEM imaging. This pre-imaging procedure is done to prevent charging of hydrogel samples from accumulation of static electric fields. The synthesized hydrogel specimens were imaged at an accelerating voltage of 10 kV and a magnification range of 2500× to 120000×.

Figure 3B:
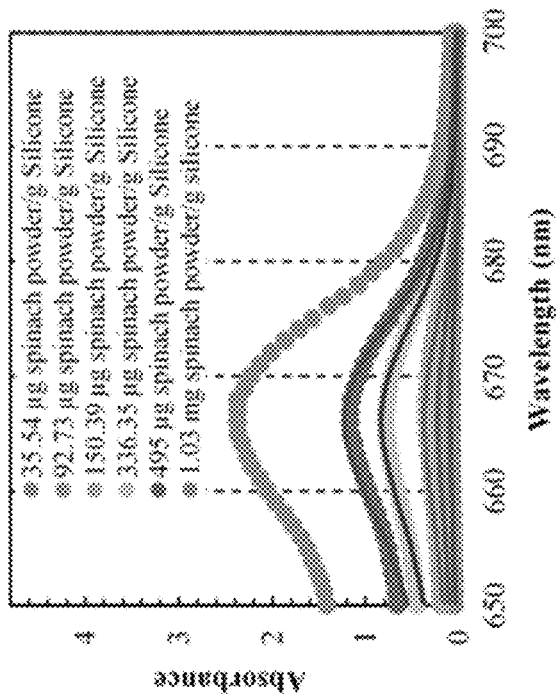
FIGS. 3A-3D show experimental absorbance spectra and corresponding fits of turmeric, spinach powder, paprika and woad powder, respectively, in the silicone hydrogel matrix.
Figure 3A:
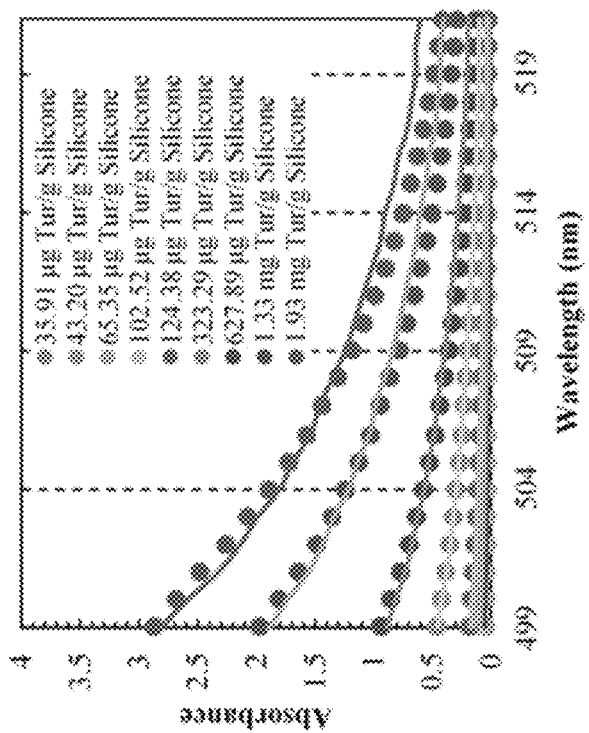
Figure 3D:
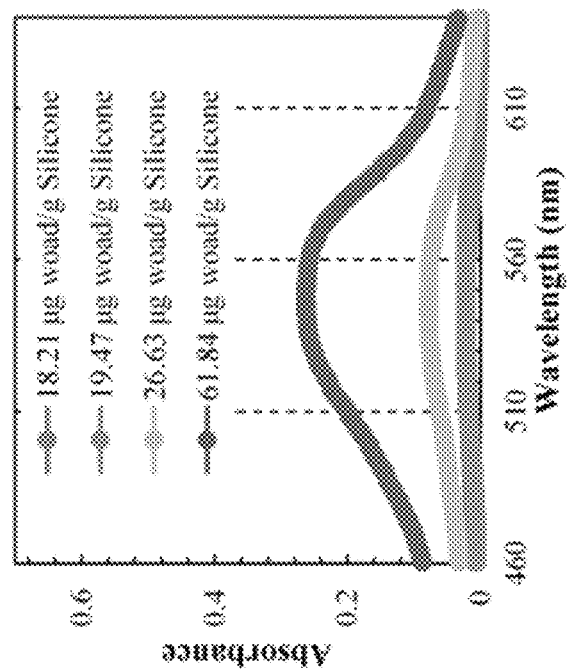
Figure 3C:
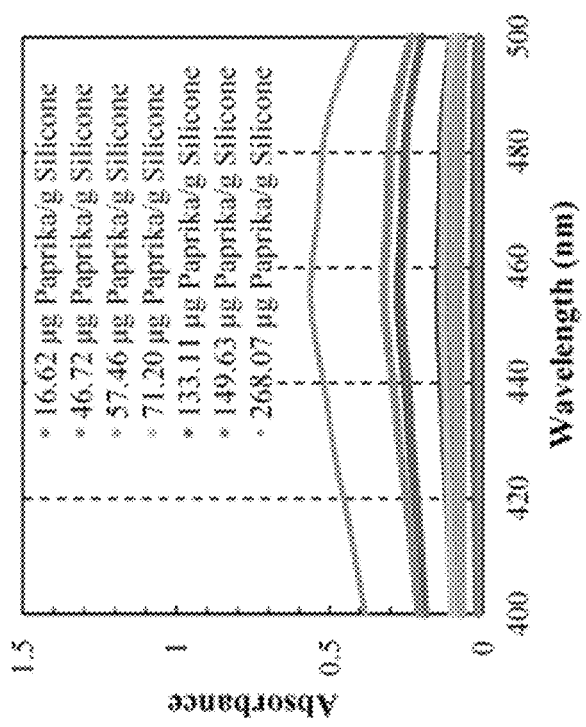
Figure 3E:
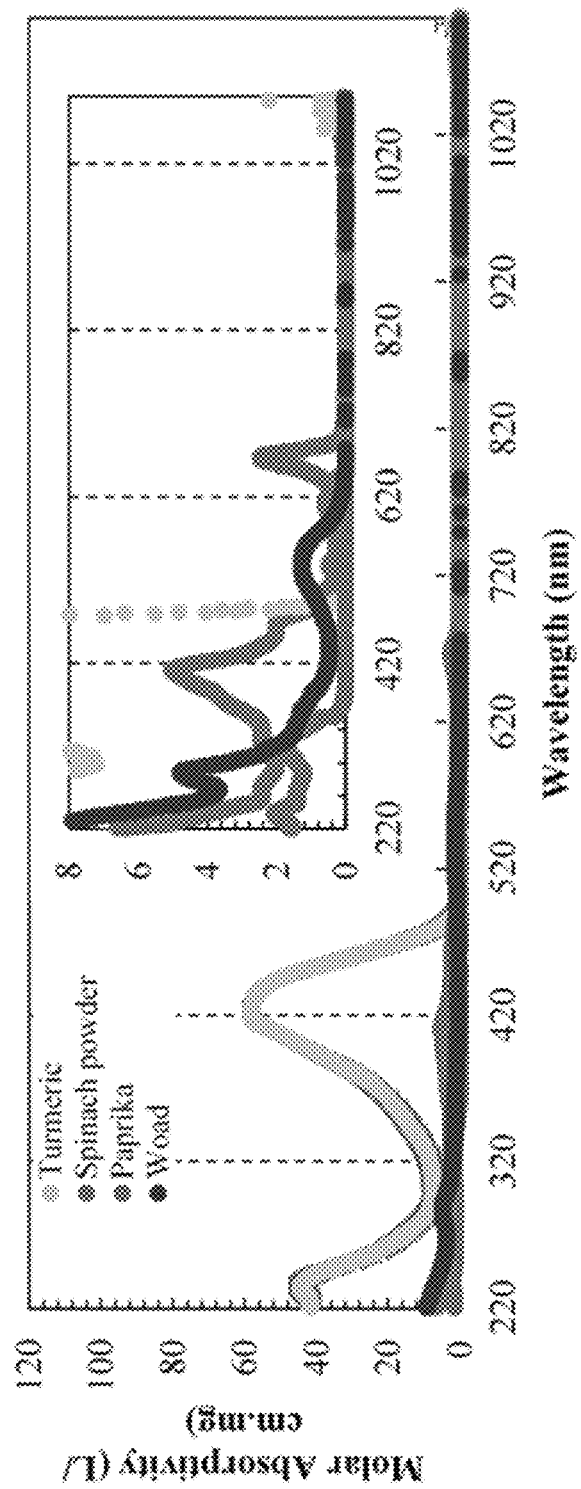
FIG. 3E shows molar absorptivities of the food colorants utilized in FIGS. 3A-3D.
Figure 4A:
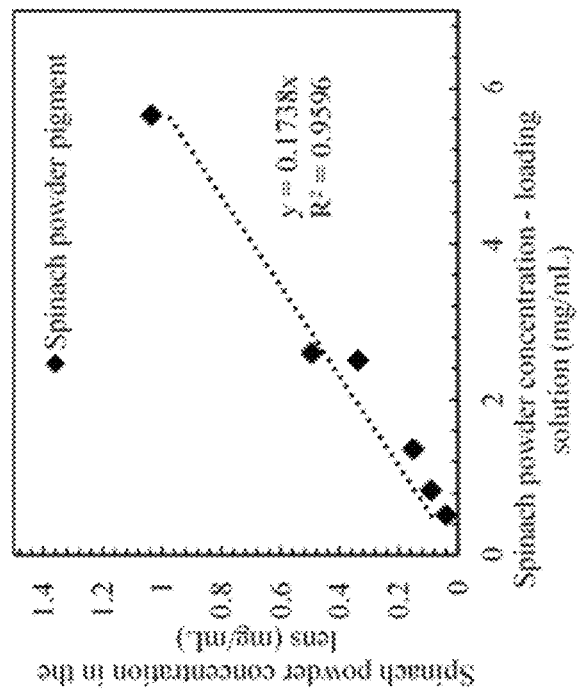
FIGS. 4A-4E show representative data for the relationship between pigment concentration in the solution phase (ethanol) and that partitioned in the lens phase.
Figure 4B:
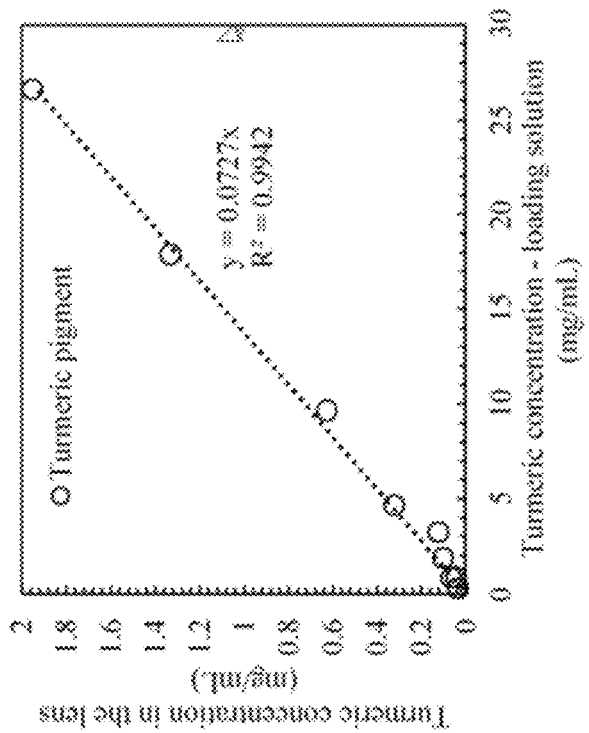
Figure 4C:
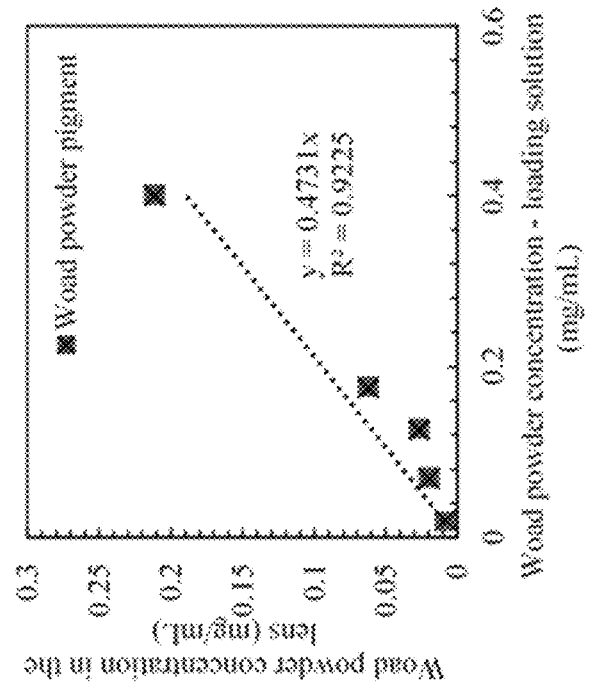
Figure 4D:
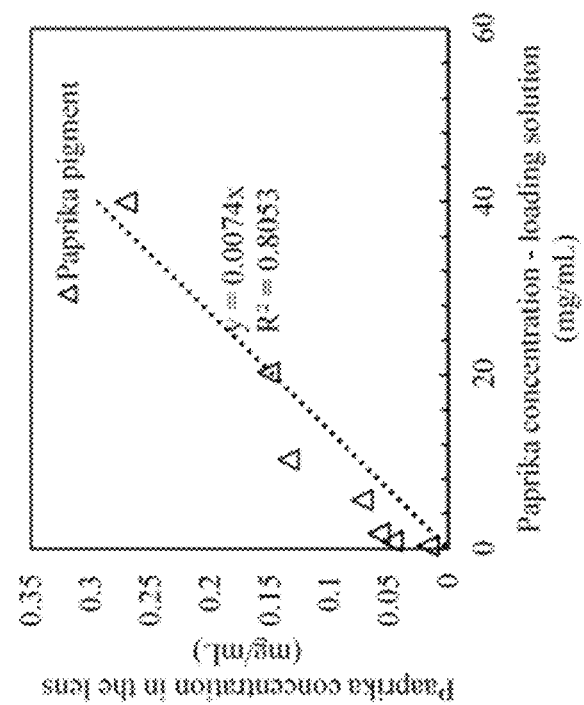
Figure 4E:
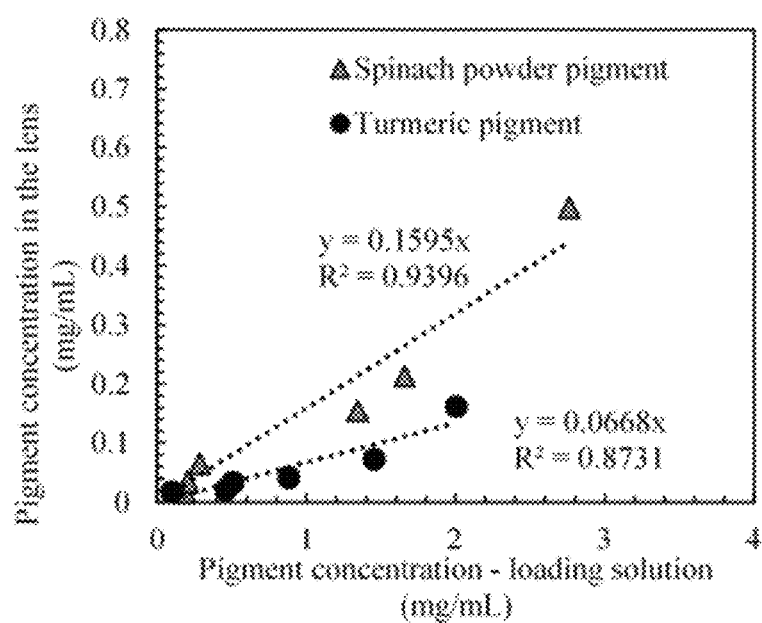

3. Results and Discussions 3.1. Molar Absorptivity and Food Colorant Concentration in Tinted Lenses FIGS. 3A-D show representative data for the measured absorbance spectra for all the pigmented lenses and the corresponding fits to Equation 1 used to quantify the amount of pigment entrapped in the lens phase. FIG. 3E summarizes the molar absorptivities of turmeric, paprika and spinach powders. It was observed that paprika, spinach and woad powder are not effective UV blockers due to low molar absorptivity values in the UVB and UVA range. Turmeric, on the other hand with two aborption peaks at 239 and 412 nm respectively shows superior class 1 UV blocking characteristic features. This is further strongly evidenced by the transmittance measurements of turmeric loaded p-HEMA and silicone hydrogel lenses with >97% UVA, UVB and high energy visible (HEV) raditions.

3.2. Transmittance Studies of Pigmented p-HEMA and Silicone Hydrogel Lenses

Figures 5A, 5B:
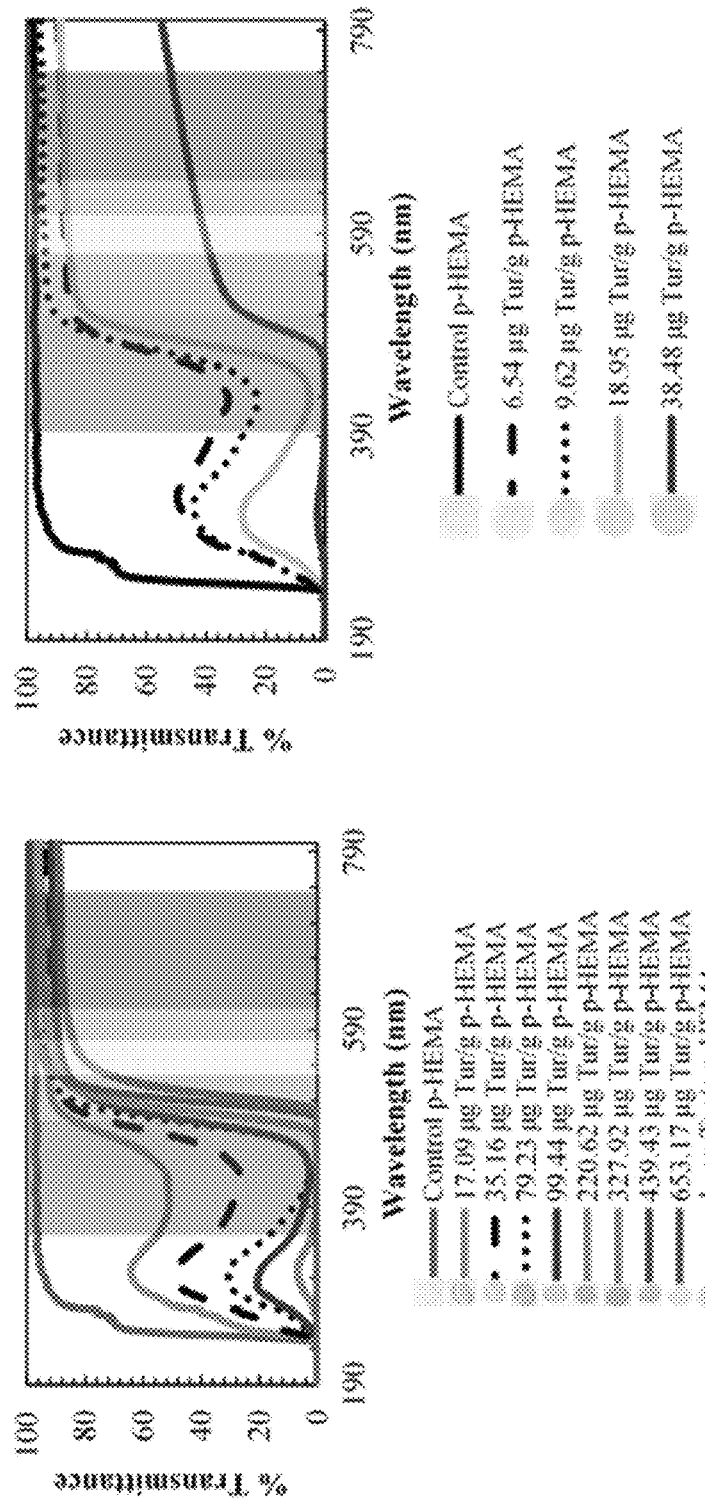
FIGS. 5A-5F show representative data for the disclosed hydrogel lenses.

FIG. 5A shows the transmission spectra of turmeric pigment loaded p-HEMA lenses prepared by soaking a 200 µm thick pre-polymerized p-HEMA hydrogel lenses in filtered turmeric-ethanol loading solution (6 mL) with loadings of turmeric in ethanol ranging from 0.5 wt. %-33 wt. %. The resultant loadings of turmeric partitioned into the p-HEMA lenses were estimated to be in the range of 17.09 µg-1 mg of turmeric loading/g of dry lens. The modified lens retained >90% transmittance from 570 nm-750 nm which corresponds to a yellow-orange-red light band of the visible range in the electromagnetic spectrum. The benefits of higher turmeric loadings to generate a darker hue without compromising transparency of the lenses were exploited by this approach of tinting a pre-polymerized hydrogel. Further, a more compelling result is the potential classification of these designed lenses as class 1 UV blockers with retention of >90% transparency of visible light in the electromagnetic spectrum. In addition to blocking >95% of the UVA spectrum, pigmented turmeric loaded p-HEMA lenses also provide an additional benefit of filtering >90% of the high energy visible radiation whose chronic exposure is harmful for the retina, thus impacting the processing of physical objects by visual centers in infants (Ref. 9). A lens diameter of 18-22 mm ensures complete pupillary coverage which limits a peripheral glare or intensity shifts that could potentially trigger symptoms related to abnormal vision (Refs. 69-71).

A similar trend is seen for turmeric loaded silicone hydrogels (FIG. 6A) prepared by soaking control lenses in turmeric/ethanol solutions, which potentially screens out >97% of UVA-UVC spectrum with <10% loss of transparency in the visible light spectrum. In a 2013 neurological research study, prolonged exposure to blue light evidenced initiation of cortical spreading depression (CSD), an underlying cause for triggering migraine aura through propagation of neuron activity (Refs. 70-71). The yellow-tinted lenses with its ability to phase out >97% HEV radiation is well-suited to serve as ophthalmic devices for migraine preventive therapy. In comparison to p-HEMA lenses, silicone hydrogels are more effective UV-blockers with >60% cumulative UV radiation screening for lower turmeric loading of 43.20 µg/g silicone in the hydrogels. Since the microstructure of silicone hydrogels contain co-continuous morphology comprising of DMA and TRIS, the adsorbed hydrophobic turmeric likely partitions into the polymerized TRIS phase, thus forming localized turmeric-rich zones with high UV-blocking capacity. An 18% excess loading of turmeric in silicone hydrogels in comparison to turmeric loaded p-HEMA gels supports this hypothesis.

Figures 6A, 6B:
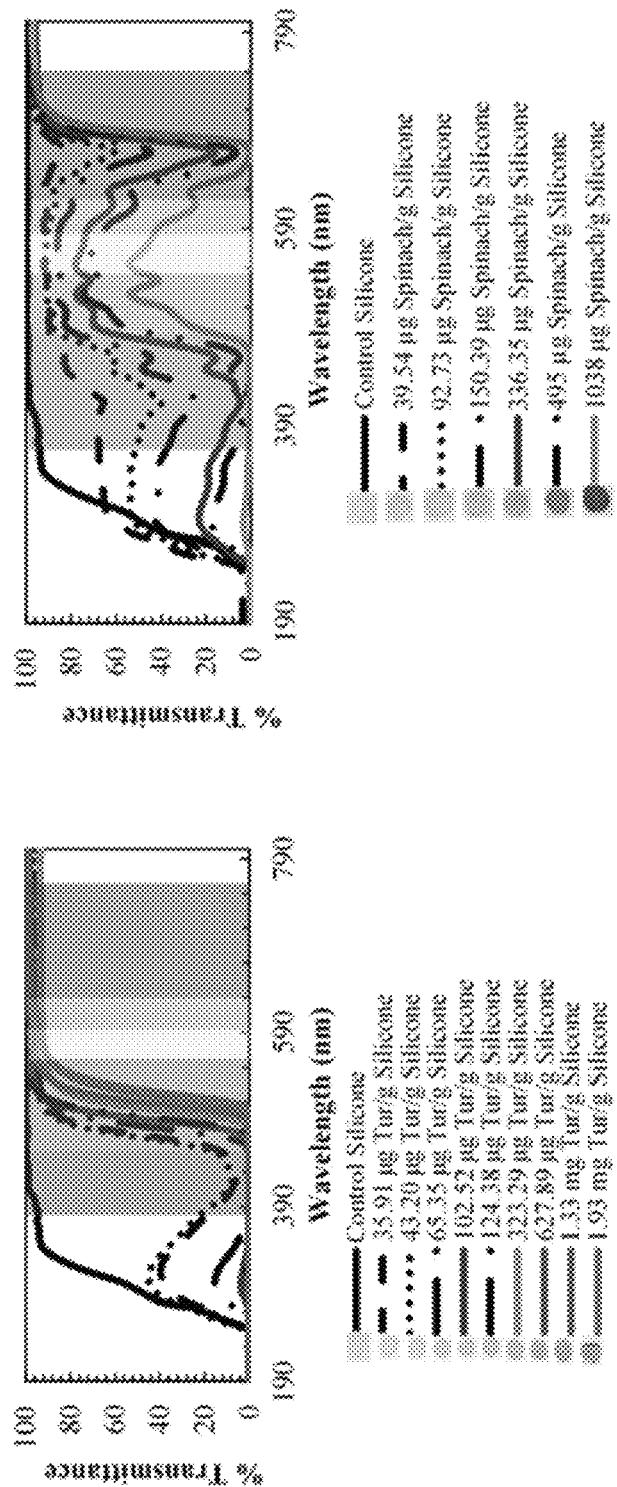
FIGS. 6A-6E show representative data pertaining to disclosed hydrogel lenses.
Figure 6D:
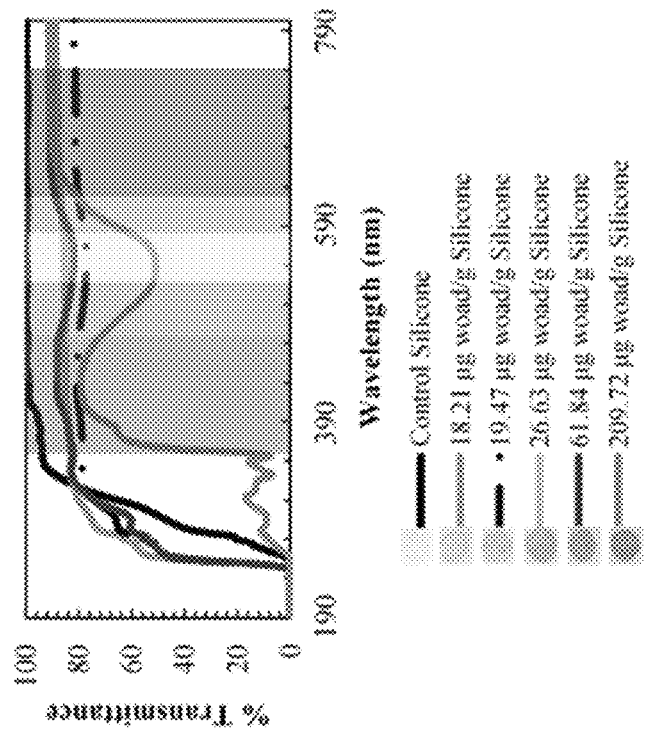
Figure 6C:
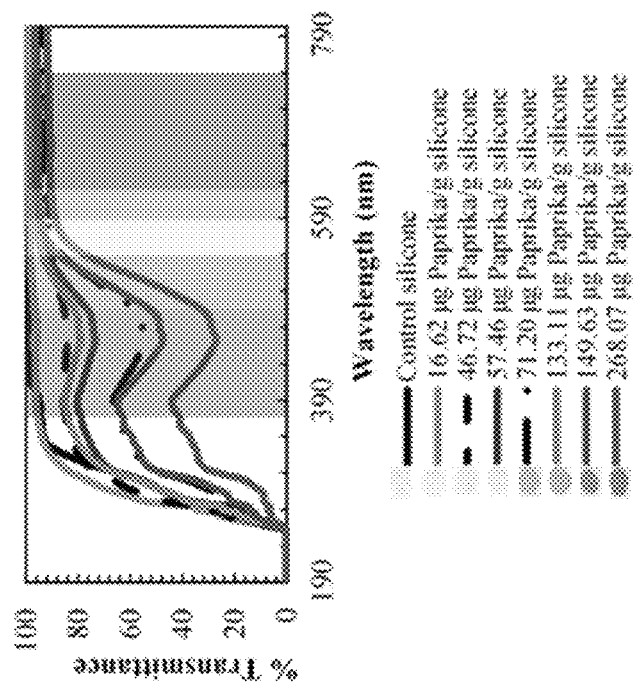
Figure 6F:
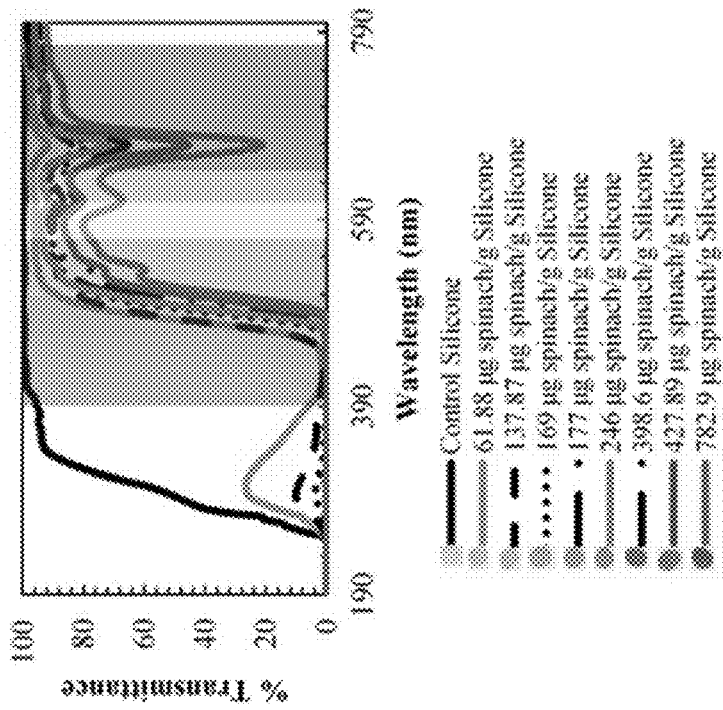
FIG. 6F shows representative transmittance spectra of 200 µm thick turmeric/spinach powder loaded silicone hydrogel lens after exposure to sunlight for 7 days. The resultant pigment mass recorded was 68.73 µg-1.38 mg of spinach powder loading/g of dry lens. In comparison to control spinach powder loaded lenses, a 50% reduction in degradation of active pigment was observed.
Figure 6E:
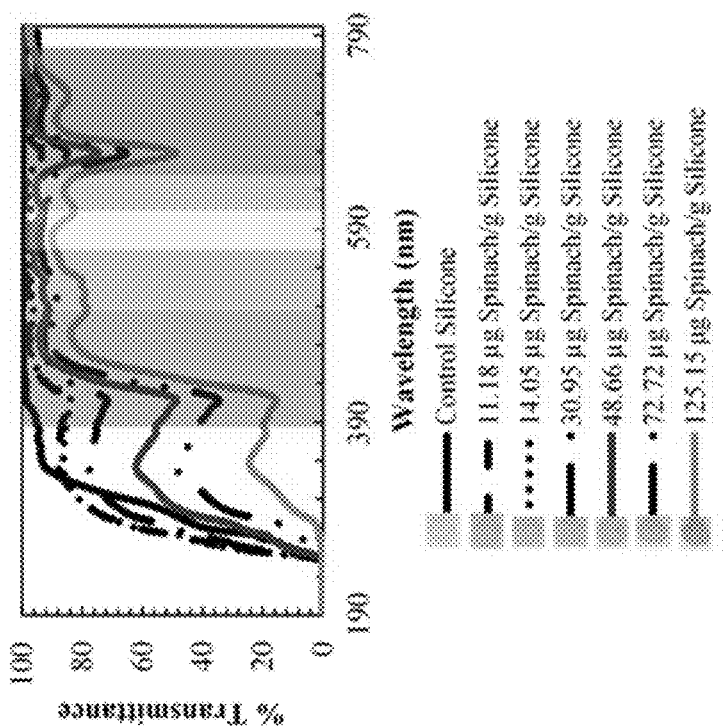

FIG. 6B shows transmittance data for silicone lenses tinted with different loadings of spinach powder generating a green hue. Transmittance measurements were taken 24 hours after lens preparation. p-HEMA and silicone hydrogel lenses with >1 mg of spinach powder loading exhibit class 1 UV blocking characteristics with >70% screening of HEV radiations. Silicone hydrogels loaded with 336.35 µg of spinach powder show an average of 24% reduction in green-yellow light band with selective filtering of a longer-range bandwidth (near-red region). Such exclusive features of the green-tinted lenses, along with their ability to filter visible radiation from selective wavelength bandwidth, show their potential as optical devices designed for migraine therapy. A major limitation involved with spinach powder loaded lenses is the reduction in tint due to degradation of the extracted pigment after a week's exposure of these lenses to sunlight. A green-tinted lens with a 1 mg spinach powder/g dry lens loading shows an 82.46% degradation of the active pigment in these lenses (FIG. 6E). Another potential drawback caused by pigment degradation is the transmission of >20% UVA radiation which contravenes with the FDA guidelines requiring >95% filtering of the same. Table 2 summarizes the amount of active extract in the lenses loaded with spinach powder after a 7-day PBS storage. An 82.46% degradation in the spinach powder extract is observed.

TABLE 2

% Degradation in spinach powder green-tinted silicone hydrogel lenses

| Food Colorant Loading in 6 ml ethanol/g | 0.03 | 0.06 | 0.1 | 0.2 | 0.5 | 1 |
|---|---|---|---|---|---|---|
| Spinach mass in lenses after preparation/[μg/g] | 39.542 | 92.731 | 150.4 | 336.36 | 495 | 1038 |
| Spinach mass in degraded lenses/[μg/g] | 11.184 | 14.059 | 30.953 | 48.667 | 72.722 | 125.16 |
| Volume of lens/(μL) | 48.4 | 47.4 | 46.5 | 47.7 | 46.7 | 48 |
| Spinach concentration/(μg/mL) | 11.184 | 14.059 | 30.953 | 48.667 | 72.722 | 125.16 |
| % Degradation | 71.717 | 84.84 | 79.42 | 85.531 | 85.309 | 87.943 |

To reduce degradation of the spinach pigment, turmeric was added to the spinach/ethanol solution to extract a combination of pigments from both the food colorants. The motive behind turmeric's addition is its high stability under prolonged sunlight exposure and its effective HEV blocking capacity which can potentially retard the degradation of spinach pigment extract. FIG. 6F shows the representative transmittance spectra of 200 μm thick turmeric/spinach powder loaded green-pigmented silicone hydrogel lens after exposure to sunlight for 7 days. The transmittance measurements of pigments extracted from a 1:1 mixture of turmeric and spinach (2.4 wt. %-15 wt. %) in ethanol indicate a 50% reduction in degradation of spinach in these lenses. Other food colorants including woad powder and paprika were also used to render the lenses with a pink and orange hue respectively. Transmittance measurements shown in FIGS. 6C-6D indicate that these pigments promote selective absorption of a narrow range of wavelengths (430-500 nm and 490-625 nm), thereby reducing overlap between red-green and blue-yellow colors. This aids in enhanced color perception and can serve as a potential optical device for people with Deutranopia. Tritanopia or blue-yellow color blindness is a rarer form of color-blindness occurring in ~1% of the male and 0.03% of the female population. Silicone hydrogels tinted with paprika promotes a yellow-orange tint to the hydrogel, which can selectively filter portions of cyan and green light (~450-510 nm), thus aiding CVD patients to discriminate between blue and yellow hues of the objects that are visually processed. A summary of common eye disorders and tinted lenses synthesized for their effective treatment is presented in Table 3. The characteristic wavelength range blocked to achieve therapeutic effect is also summarized.

TABLE 3

| Type of Indication | Lens type | Wavelength range filtered (nm) | Therapeutic effect |
|---|---|---|---|
| Retinal damage from UV exposure | Turmeric (T) silicone/p-HEMA lenses | 190-495 nm (T) | Class 1 UV Blockers with >95% blocking of the UVR spectrum. Effective in preventing retinal damage. |
| Migraine/ Photophobia | Spinach (S), Paprika (P), Turmeric/spinach (T/S), and Turmeric/Paprika (T/P) silicone lenses | 190-450 nm & 620-650 nm (S), 190-495 nm & 620-650 nm (T/S), 190-550 nm (P), 190-490 nm (T/P) | UV Blockers with >70% blocking of UVR spectrum and >20% blocking of visible spectra aiding in reduction of light intensity. Effective in reducing the frequency of attacks among migraineurs. |
| Amblyopia | Spinach (S), Paprika (P) and Turmeric (T) silicone lenses | 190-450 nm and 620-650 nm (S), 190-550 nm (P), 190-495 nm (T) | UV blockers with >70% blocking of UVR spectrum minimizes retinal damage, critical among the aging infant population. Effective occlusion patches and refractive error correction lenses. Lens pair with different tints effective for correcting the amblyopic eye through forced focus on specific images. |
| Color Vision Deficiency (CVD) | Paprika (P) and Woad (W) silicone lenses | 473-622 nm (W) and 450-520 nm (P) | Selective filtering of aiding enhanced color perception among CVD patients. |

FIG. 5B shows the transmission spectra of tinted p-HEMA hydrogel lenses designed through direct incorporation of different turmeric loadings in HEMA/water monomer mixture (FIG. 5C) prior polymerization. Transmission spectra of 200 μm thick p-HEMA tinted lenses with 6.54-18.95 μg of turmeric loading/g of dry lens exhibit potential for a class 2 UV-blocking lenses with additional HEV radiation filtering, but falls short of FDA guidelines due to >20% transmission of UVB radiation. Higher turmeric loadings >65 μg of turmeric loading/g of dry lens resolve the issue with >95% UV radiation filtering but, affects the transmission of visible light and transparency of the fabricated lenses. The loss of transparency in the lenses for higher turmeric loadings could potentially be attributed to the phase separation of extracted pigment during free radical polymerization of HEMA. The phase separated pigment form particles leading to aggregation. To overcome aggregation of particles within the monomer mixture in the mold during polymerization, the mass of photo initiator, Darocur TPO was increased to enhance the rate of polymerization. It was observed that the time scale for aggregation was faster in comparison to the rate of polymerization of the hydrogel phase even when the concentration of the initiator was increased to 1 wt. %. The addition of the photo initiator more than 1 wt. % resulted in a turbid HEMA monomer mixture which resulted in translucent hydrogels. A loss of >50% transmission of visible light for higher turmeric loadings makes it a less attractive route to fabricate UV-blocking lenses and was not further employed for rest of the food colorants.

3.3. Pigmented Commercial and Scleral Lenses

Figure 7C:
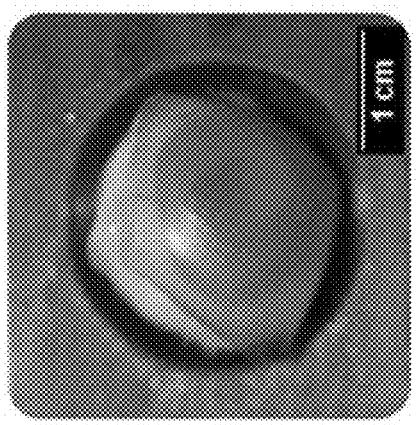
FIGS. 7A-7E show representative photographic images of disclosed hydrogel lenses on rabbit cadaver eyes.
Figure 7E:
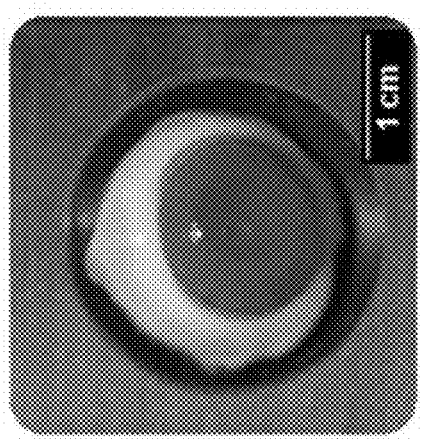
Figure 7B:
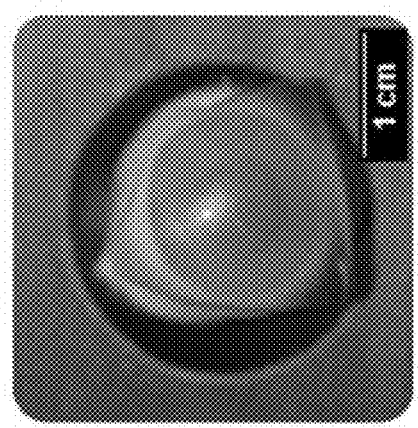
Figure 7D:
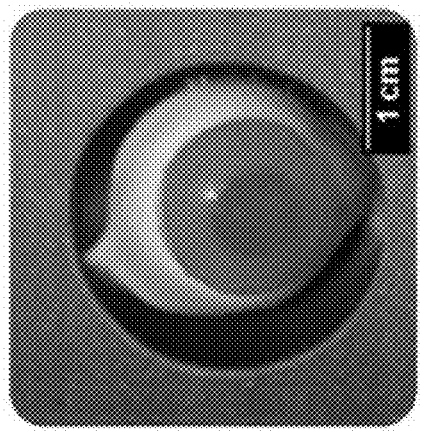
Figure 7A:
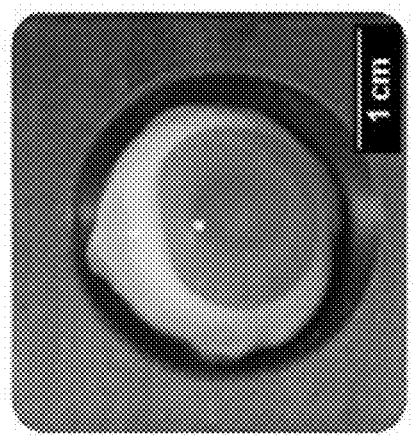

The size and shape of fabricated tinted lenses could potentially be tailored for synthesizing scleral lens for patients suffering from conditions like Keratoconus, an irregular corneal surface. FIG. 7B shows lab-made scleral lenses placed on the surface of a control Albino rabbit cadaver eye (FIG. 7A). The scleral lenses were synthesized by polymerizing silicone monomers described in section 2.2 in ACUVUE® OASYS® commercial blister packs to induce curvature. Tinted scleral lenses of 18-20 mm diameter ensures complete pupillary coverage, thus limiting a peripheral glare or intensity shifts that could potentially trigger symptoms related to photophobia. The fabricated scleral lenses presented in the figures were tinted with extracted pigments from turmeric and spinach powders. FIG. 7C demonstrates the induction of tint to commercial lens brands including ACUVUE® TruEye® and Air Optix™ NIGHT & DAY™ AQUA. Transparent tinted lens synthesized with ACUVUE® TruEye® and Air Optix™ NIGHT & DAY™ AQUA show promise of effective and efficient integration of the pigment in commercial lenses.

3.4. Pigment Leaching and Effect of Lens Sterilization on UV Blocking

Figures 5C, 5D:
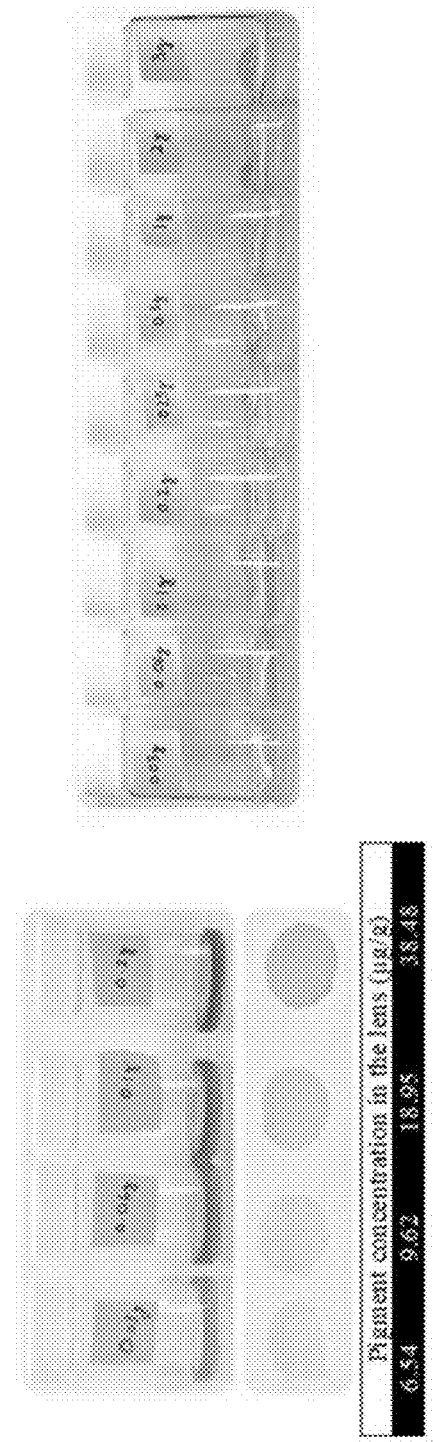
Figure 5F:
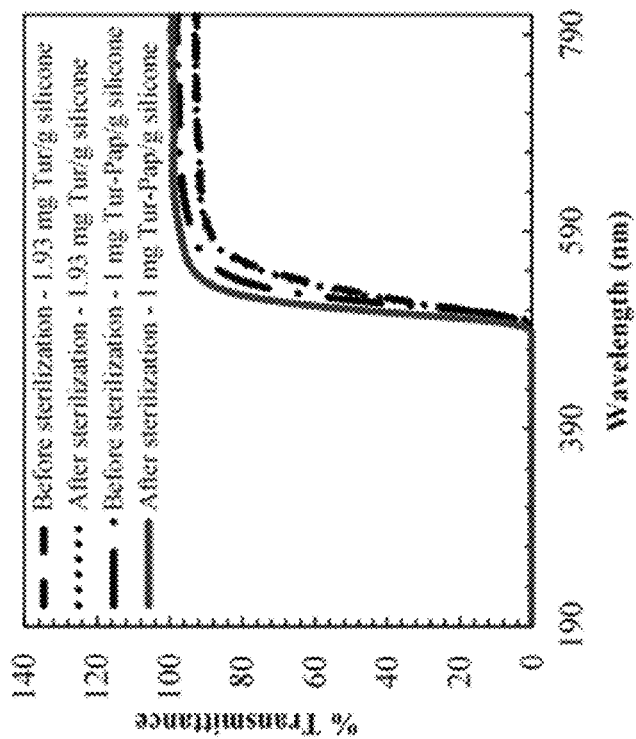
Figure 5E:
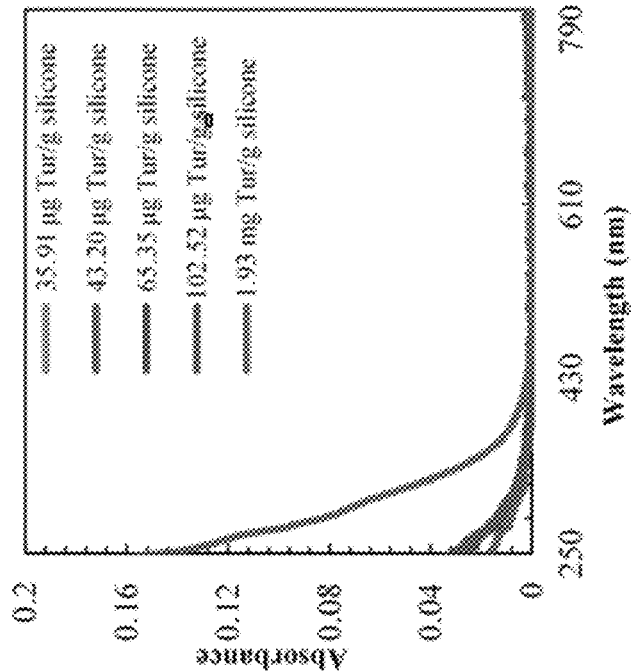

Organic food colorants used in this study namely turmeric and woad powder are known for their medicinal properties. Bio-active components in turmeric possess anti-inflammatory, anti-cancer and anti-microbial properties. Curcumin, a principal pigment in turmeric is linked to improved brain function (BDNF booster), effective rheumatoid arthritis and blood pressure management. Though no studies reveal or raise the cytotoxicity concerns of turmeric diffusion into the tear film, preventing pigment leaching from these biocompatible devices is usually preferred to minimize the potential for toxicity. The potential for release of the pigment was measured from turmeric-tinted lenses by storing the lenses in PBS medium (3 mL) for 7 days. Before storing the lenses in PBS, the tinted lenses were rinsed in ethanol for ~10 s to remove the surface adsorbed turmeric deposits. These silicone lenses were air-dried and immersed in PBS medium (3 mL) to monitor leaching of turmeric pigment embedded within the hydrogel matrix as shown in FIG. 5D. FIG. 5E presents the UV spectra of turmeric pigment leached from the surface of the tinted lenses after 7 days of PBS storage. The release data indicates negligible pigment diffusion in the measured UV range, indicating that most of the pigment in entrapped within the hydrogel matrix. The transmittance of the turmeric and woad powder loaded lenses were measured again to examine >95% retention of UV blocking characteristics after pigment leaching in the PBS medium. The effect of sterilization of the contact lens on stability of the pigment was also examined. The yellow-tinted lenses stored in a 3 mL PBS medium were sterilized by placing them in an oven pre-heated to 100° C. for 3 hrs. The transmittance data shown in FIG. 5F for both turmeric loaded lenses and turmeric/paprika loaded lenses show negligible change indicating preservation of UV-blocking characteristics and a stable tint.

3.5. SEM Images of Pigmented Silicone Hydrogels

Figure 8A:
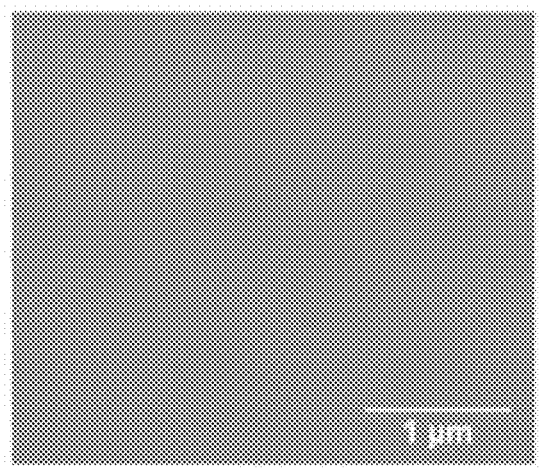
FIGS. 8A-8F show representative scanning electron micrograph (SEM) images of disclosed hydrogels loaded with disclosed colorants. The SEM images are of a 200 µm thick silicone hydrogel loaded with turmeric and spinach powder. These tinted lenses were prepared by soaking in 17.42 wt. % turmeric/ethanol, spinach powder/ethanol and paprika/ethanol solutions.
Figure 8B:
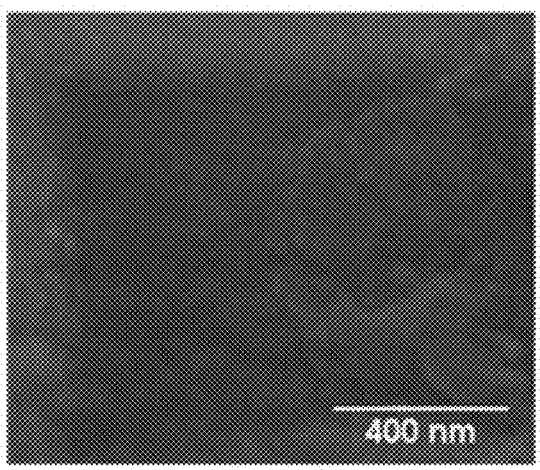
Figure 8C:
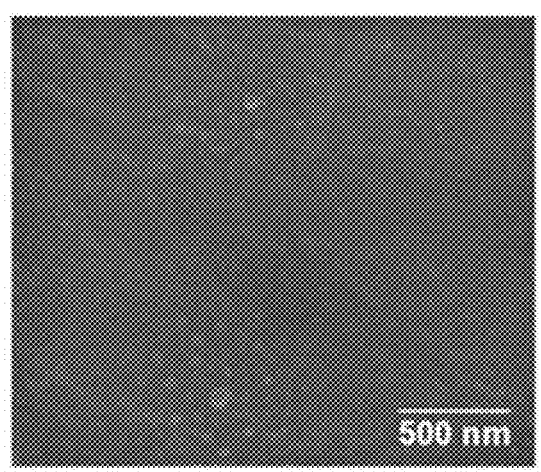
Figure 8D:
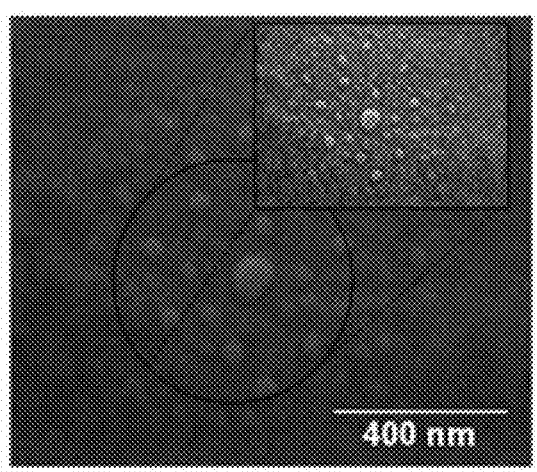
Figure 8E:
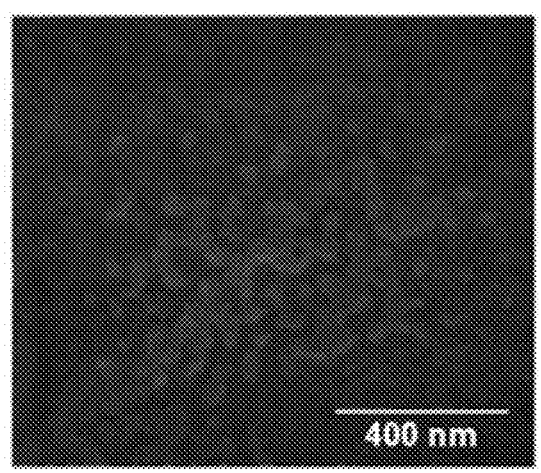
Figure 8F:
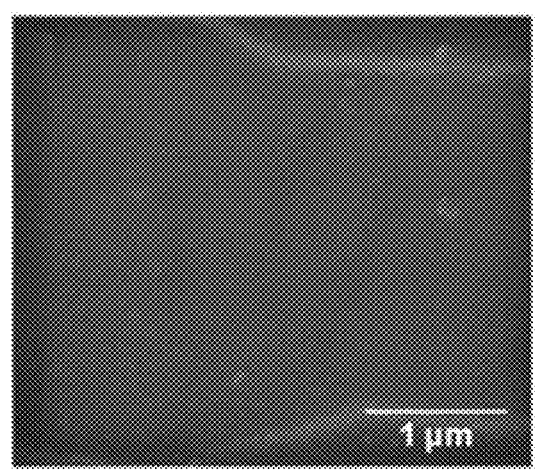

The pigmented hydrogel matrices were imaged by SEM to inspect the presence of precipitated pigment particles in the polymer matrix. The pigmented silicone hydrogels samples imaged by SEM were synthesized by soaking the control lenses in 17.42 wt. % turmeric/ethanol, spinach powder/ethanol, and paprika/ethanol powder solutions respectively. SEM image of turmeric loaded silicone lens (FIG. 8A) does not reveal presence of particles in the hydrogel matrix at 40000X magnification factor. Investigation of a different cross-sectional area in the hydrogel matrix revealed presence of non-spherical particles at a magnification factor of 60000-120000X (FIGS. 8B-8D). The particle size characterization done in ImageJ software revealed a Feret diameter of 50 nm with a 1:1 aspect ratio. Though, the geometric properties of these particles does not impact extended drug delivery, potential binding of certain drugs to these hydrophobic particles may find applications in controlled delivery. The dimensions of the largest bound particle analyzed at 120000X in the silicone hydrogels is less than 86 nm, which will still not scatter significant light while the smallest sizes are too large to diffuse out of the lenses. Similarly, SEM images respresented in FIGS. 8E-8F taken at 120000X correspond to lenses tinted with spinach and paprika powders show presence of particles in the lens matrix.

The pigment from the agro products considered here was extracted into ethanol. The ethanol soluble pigment is ideal for incorporation into contact lenses to produce tinted lenses. The swelling of the p-HEMA and silicone lens in ethanol allows direct entrapment of the pigment in the hydrogel phase. The pigments are larger than the pores in the hydrogel which allow effective retention with negligible leaching. A 400 μg-1 mg turmeric loaded p-HEMA and silicone hydrogels act as class 1 UV blockers with retention of >90% transparency of visible light in the electromagnetic spectrum. In addition to blocking >95% of the UVA spectrum, pigmented turmeric loaded p-HEMA lenses also provide an additional benefit of filtering >90% of the high energy visible radiation whose chronic exposure is harmful for the retina. Spinach, paprika and woad powder loaded silicone lenses impart different shades mitigating >20% visible light transmission from selective wavelengths. They can potentially be used for treating photophobia, a symptom of severe migraine attacks, managing color deficient vision. Silicone lenses with loadings >1 mg/g food colorant also find practical use in Amblyopia therapy.

Table 4 below summarizes food colorant composition and extraction information, along with associated references.

TABLE 4

| Food Colorant | Color[#] | Composition | References[*] | Extraction Technique | References[**] |
|---|---|---|---|---|---|
| Turmeric | Yellow | Curcumoids<br>Curcumoid composition<br>42-60% Curcumin<br>24-30% Demethoxy curcumin<br>10-34% Bisdemethoxy curcumin | Refs. 29, 31, 32, 34, 35, and 39 | Soxhlet extraction of ground turmeric in organic solvents | Refs. 29, 32, 34, 39, and 76 |
| Paprika | Orange | Carotenoids<br>Carotenoid composition<br>10-26.8% β-Carotene<br>24.2% Xanthophylls and isomers<br>49% Xanthophyll esters | Refs. 40-54 | Dissolution of ground paprika powder in organic solvents | Refs. 41, 43-50, 78, and 80 |
| Spinach powder | Green | Chlorophyll-a and Chlorophyll-b | Refs. 57-62 | Dissolution of ground spinach powder in organic solvents | Refs. 57-62 and 77-78 |
| Wood powder | Pink | Indigorubin | Refs. 63 and 65-68 | Soxhlet extraction of powdered *Isatis tinctoria* leaves in organic solvents | Refs. 65-66 and 79 |

[#]Color imparted to the lens.
[*]References pertaining to characterization of pigment composition.
[**]References pertaining to pigment spectral information.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A contact lens comprising a three or more colorants, wherein the colorants comprises wood and two or more of: turmeric, paprika, spinach, or carbon black.

2. The contact lens of claim 1, wherein the amount of turmeric, when present, in the hydrogel is about 2 mg/g hydrogel to 700 micrograms/g hydrogel or the amount of spinach, when present, in the hydrogel is about 30 mg/g hydrogel to 600 micrograms/g hydrogel or the amount of paprika, when present, in the hydrogel is about 15 micrograms/g hydrogel to 300 micrograms/g hydrogel, and wherein the amount of wood in the hydrogel is about 15 micrograms/g hydrogel to 80 micrograms/g hydrogel.

3. The contact lens of claim 1, further comprising a hydrogel, wherein the hydrogel entraps the colorants within the hydrogel or the colorants are absorbed onto a surface layer of the contact lens.

4. The contact lens of claim 1, further comprising a hydrophilic ophthalmic drug, a hydrophobic ophthalmic drug, vitamin E, or a combination thereof.

5. A contact lens comprising a three or more colorants, wherein the colorants comprise spinach, woad, and one or more of: turmeric or paprika, wherein the amount of turmeric, when present, in the hydrogel is about 2 mg/g hydrogel to 700 micrograms/g hydrogel or the amount of paprika, when present, in the hydrogel is about 15 micrograms/g hydrogel to 300 micrograms/g hydrogel; wherein the amount of spinach in the hydrogel is about 30 mg/g hydrogel to 600 micrograms/g hydrogel and wherein the amount of woad in the hydrogel is about 15 micrograms/g hydrogel to 80 microdrams/d hydrogel.

6. The contact lens of claim 5, wherein the colorants comprise turmeric, wherein the amount of turmeric in the hydrogel is about 2 mg/g hydrogel to 700 micrograms/g hydrogel.

7. The contact lens of claim 5, wherein the colorant colorants comprise paprika, wherein the amount of paprika in the hydrogel is about 15 micrograms/g hydrogel to 300 micrograms/g hydrogel.

8. The contact lens of claim 5, wherein the colorants comprise spinach, woad, turmeric, and paprika.

9. The contact lens of claim 5, wherein the colorants consist of spinach, woad, turmeric, and paprika.

10. The contact lens of claim 5, further comprising a hydrogel, wherein the hydrogel entraps the colorants within the hydrogel or the colorants are absorbed onto a surface layer of the contact lens.

11. The contact lens of claim 5, further comprising a hydrophilic ophthalmic drug, a hydrophobic ophthalmic drug, vitamin E, or a combination thereof.

12. The contact lens of claim 5, further comprising vitamin E, wherein the vitamin E loading is 5% to 40% (w/w) in the contact lens.

\* \* \* \* \*